United States Patent
Ichimaru

(10) Patent No.: US 9,983,003 B2
(45) Date of Patent: May 29, 2018

(54) ANGULAR ACCELERATION DETECTION DEVICE

(71) Applicant: Murata Manufacturing Co., Ltd., Nagaokakyo-shi, Kyoto-fu (JP)

(72) Inventor: Masayuki Ichimaru, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 437 days.

(21) Appl. No.: 14/064,371

(22) Filed: Oct. 28, 2013

(65) Prior Publication Data

US 2014/0047919 A1 Feb. 20, 2014

Related U.S. Application Data

(63) Continuation of application No. PCT/JP2011/079139, filed on Dec. 16, 2011.

(30) Foreign Application Priority Data

May 12, 2011 (JP) .................................. 2011-107338

(51) Int. Cl.
*G01C 19/56* (2012.01)
*G01P 15/08* (2006.01)

(52) U.S. Cl.
CPC .......... *G01C 19/56* (2013.01); *G01P 15/0888* (2013.01)

(58) Field of Classification Search
CPC .............................. G01C 19/56; G01P 15/0888

(Continued)

(56) References Cited

U.S. PATENT DOCUMENTS 5,101,669 A * 4/1992 Holm-Kennedy .. G01P 15/0802
361/278
8,869,615 B2 * 10/2014 Janiaud .............. G01C 19/5607
73/504.12

(Continued)

FOREIGN PATENT DOCUMENTS

CN 101059527 A 10/2007
CN 101949952 A 1/2011

(Continued)

OTHER PUBLICATIONS

Official Communication issued in corresponding Chinese Patent Application No. 201180070708.9, dated May 28, 2014.

(Continued)

*Primary Examiner* — Lisa Caputo
*Assistant Examiner* — Tarun Sinha
(74) *Attorney, Agent, or Firm* — Keating & Bennett, LLP

(57) ABSTRACT

An angular acceleration detection device includes a rotating weight, a fixed portion, a support beam, and a detection portion. The rotating weight is rotatable about a Z-axis with respect to the fixed portion by action of an inertial force generated by an angular acceleration about the Z-axis. The fixed portion is disposed at a position spaced from the rotating weight. The support beam is disposed in an X-Y plane between the fixed portion and the rotating weight, the support beam elastically supporting the rotating weight with respect to the fixed portion. The detection portion outputs a detection signal corresponding to stress generated in the support beam. A gravity center position of the rotating weight is aligned with the support beam when viewed in a Z-axis direction.

18 Claims, 22 Drawing Sheets

(58) Field of Classification Search
USPC .................................................. 73/504.12
See application file for complete search history.

(56) References Cited

U.S. PATENT DOCUMENTS

| | | | | |
|---|---|---|---|---|
| 2001/0042404 | A1* | 11/2001 | Yazdi | ................. G01P 15/0802 |
| | | | | 73/504.12 |
| 2004/0182155 | A1* | 9/2004 | Najafi | ................. G01P 15/0802 |
| | | | | 73/514.32 |
| 2005/0179338 | A1* | 8/2005 | Tamura | ................. H02N 1/008 |
| | | | | 310/309 |
| 2007/0240511 | A1 | 10/2007 | Higuchi et al. | |
| 2011/0006380 | A1 | 1/2011 | Hattori et al. | |
| 2011/0100125 | A1 | 5/2011 | Sato | |
| 2012/0017678 | A1* | 1/2012 | Rocchi | ............... G01C 19/5747 |
| | | | | 73/504.12 |

FOREIGN PATENT DOCUMENTS

| | | | |
|---|---|---|---|
| EP | 1 083 144 A1 | 3/2001 | |
| JP | 4-21970 U | 2/1992 | |
| JP | 2602300 B2 | 4/1997 | |
| JP | 2007-322200 A | 12/2007 | |
| JP | 2010-139263 A | 6/2010 | |
| JP | 2011-33617 A | 2/2011 | |
| JP | 2011-117944 A | 6/2011 | |
| WO | WO 2010112268 A1 * | 10/2010 | ......... G01C 19/5747 |
| WO | WO 2010112594 A1 * | 10/2010 | ......... G01C 19/5607 |

OTHER PUBLICATIONS

Official Communication issued in International Patent Application No. PCT/JP2011/079139, dated Mar. 27, 2012.

* cited by examiner

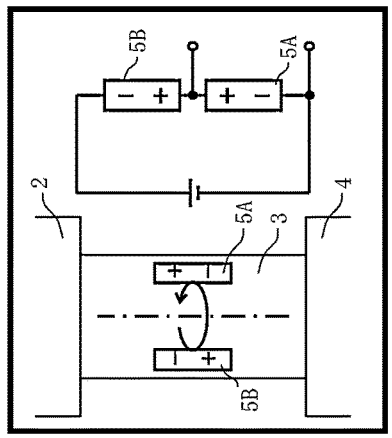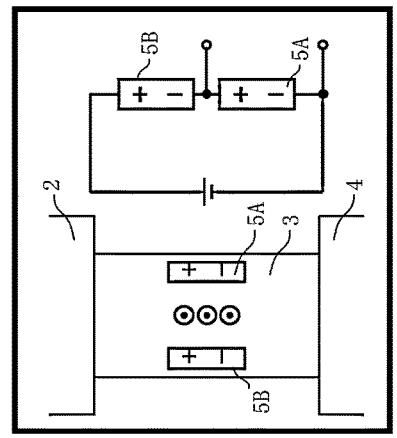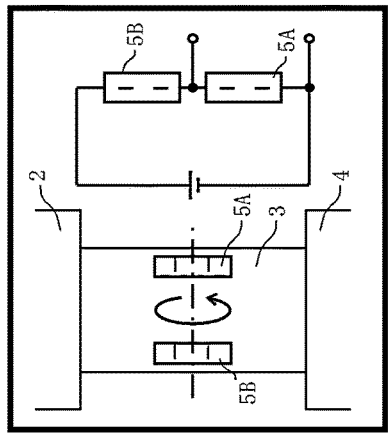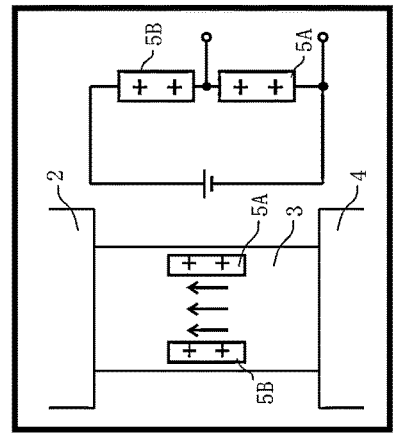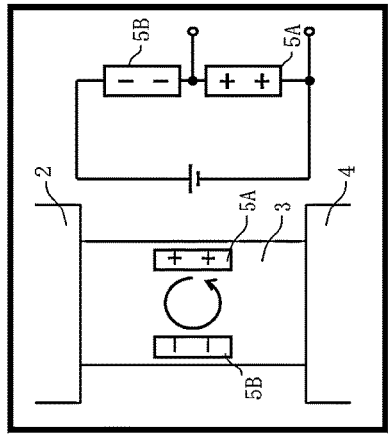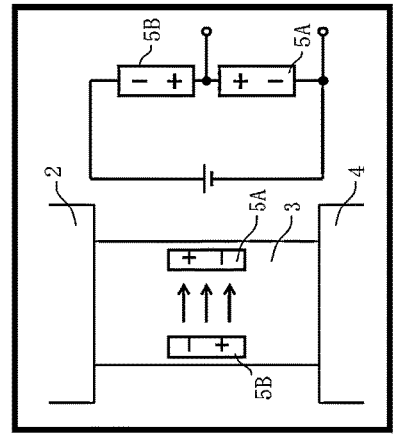

FIG. 5A
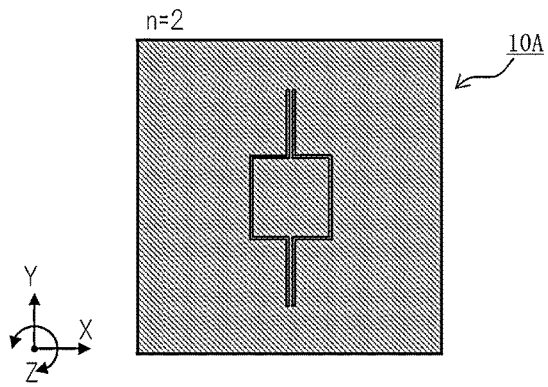
FIG. 5B
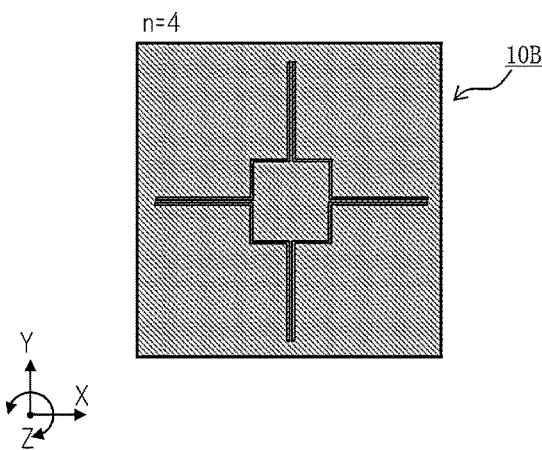
FIG. 5C
|  | device 1 | device 10A | device 10B |
|---|---|---|---|
| n | 1 | 2 | 4 |
| $f_0$ | 2.0kHz | | |
| Ly | 110 μm | 441 μm | 640 μm |
| Lx | 20 μm | 10 μm | 10 μm |
| σ/β | 73Pa/(rad/s$^2$) | 49Pa/(rad/s$^2$) | 29Pa/(rad/s$^2$) |

ANGULAR ACCELERATION DETECTION DEVICE

BACKGROUND OF THE INVENTION

1. Field of the Invention

The present invention relates to an angular acceleration detection device that detects an angular acceleration acting about a detection axis.

2. Description of the Related Art

One type of angular acceleration detection device includes a rotating weight, a support beam, and a detection portion (see, e.g., Japanese Patent No. 2602300 and Japanese Unexamined Patent Application Publication No. 2010-139263). The support beam is disposed to extend in a direction orthogonal to a detection axis, and opposite end portions of the support beam are connected to the rotating weight and a fixed portion, respectively. When an angular acceleration acts about the detection axis in the angular acceleration detection device, the rotating weight is rotated (oscillated) with respect to the fixed portion by the action of a rotational inertial force generated upon application of the angular acceleration. The support beam is deformed with the rotation of the rotating weight, whereupon the detection portion detects stress generated in the support beam. Because the stress generated in the support beam changes depending on the angular acceleration acting on the rotating weight about the detection axis, the angular acceleration about the detection axis can be measured from a signal detected by the detection portion.

In the angular acceleration detection device described above, if the rotation of the rotating weight about the detection axis is out of balance, the rotating weight is caused to rotate by not only the rotational inertial force, but also a translational inertial force. In such a case, the translational inertial force becomes a factor of increasing noise of the detection signal, and detection accuracy of the angular acceleration about the detection axis degrades.

To ensure balance in the rotation of the rotating weight, the angular acceleration detection device is usually formed in a symmetrical shape with respect to the gravity center position of the rotating weight being a center. Japanese Patent No. 2602300 discloses a structure in which an annular rotating weight is supported from the inner side by a plurality of support beams, which are arranged symmetrically with respect to the gravity center position of the rotating weight being a center. Japanese Unexamined Patent Application Publication No. 2010-139263 discloses a structure in which a rotating weight is supported from the outer side by a plurality of support beams, which are arranged symmetrically with respect to the gravity center position of the rotating weight being a center.

In the related art described above, because the plural support beams bear, in a distributed manner, the inertial force exerted on the rotating weight, there has been a problem that, when the angular acceleration detection device is constituted to operate at a predetermined natural frequency, stress generated in each support beam per unit of angular acceleration decreases, and the detection accuracy of the angular acceleration degrades.

In consideration of the above-mentioned problems, it is conceivable to reduce the number of support beams for the purpose of obtaining higher detection accuracy with the angular acceleration detection device. However, there has been a limitation in reducing the number of support beams because of severe restrictions on the number and the arrangement of support beams from the viewpoint of ensuring the rotational balance of the rotating weight.

SUMMARY OF THE INVENTION

Preferred embodiments of the present invention provide an angular acceleration detection device, which significantly reduces the number of support beams and achieves high detection accuracy or detection sensitivity while ensuring balance in rotation of a rotating weight.

A preferred embodiment of the present invention provides an angular acceleration detection device including a rotating weight, a fixed portion, a support beam, and a detection portion. The rotating weight is rotatable about a predetermined detection axis by action of a rotational inertial force generated about the detection axis. The fixed portion is disposed at a position spaced from the rotating weight. The support beam is disposed in a plane that is perpendicular or substantially perpendicular to the detection axis between the fixed portion and the rotating weight, the support beam elastically supporting the rotating weight with respect to the fixed portion. The detection portion outputs a detection signal corresponding to stress generated in the support beam. A gravity center position of the rotating weight is aligned with the support beam in the perpendicular or substantially perpendicular plane.

With the above-described feature, balance in rotation of the rotating weight can be ensured by providing only one support beam that is arranged to be aligned with the gravity center position of the rotating weight.

As an alternative, the angular acceleration detection device according to another preferred embodiment of the present invention includes a plurality of support beams providing a coincident neutral plane between or among stresses that act on the plural support beams with rotation of the rotating weight about the detection axis, and the gravity center position of the rotating weight is aligned with the neutral plane in the above-mentioned perpendicular or substantially perpendicular plane.

With the above-described feature, since the plural support beams provide the coincident neutral plane between or among the stresses acting on the plural support beams, a holistic stress distribution of the plural support beams is equivalent or substantially equivalent to that obtained with a single support beam. Accordingly, the balance in rotation of the rotating weight is ensured by providing only one support beam in effect.

In the angular acceleration detection device described above, preferably, the rotating weight preferably includes a thin plate in which a direction of thickness thereof is aligned with the detection axis.

With the above-described feature, since a moment of inertia of the rotating weight about the detection axis is increased, a rotational inertial force per unit of angular acceleration can be increased. It is therefore possible to increase a value of width of the support beam and to reduce a value of length of the support beam, which values are necessary to maintain the natural frequency. This contributes to increasing detection sensitivity of the angular acceleration.

In the angular acceleration detection device described above, preferably, the rotating weight has a direction of a long axis and a direction of a short axis in the perpendicular or substantially perpendicular plane.

With the above-described feature, since the moment of inertia of the rotating weight about the detection axis is further increased, the rotational inertial force per unit of angular acceleration is further increased. It is therefore possible to reduce an area that is occupied by the angular acceleration detection device and that is required to obtain the same detection sensitivity of the angular acceleration, and to realize further reduction in cost and size.

In the angular acceleration detection device described above, preferably, the support beam has a direction of length thereof set in the direction of the long axis of the rotating weight.

In the rotating weight of the above-described type, a moment of inertia about the short axis is relatively large, and a rotational inertial force caused by disturbance vibration about the short axis is also relatively large. Accordingly, if the direction of length of the support beam is set to be the direction of the short axis of the rotating weight, the support beam would be twisted by the rotational inertial force about the short axis, and excessive stress would be concentrated in edge portions of the support beam. Hence, impact resisting performance would degrade. By setting the direction of length of the support beam to be the direction of the long axis of the rotating weight as described above, the support beam is prevented from being twisted by the rotational inertial force caused by disturbance vibration about the short axis, and stress is prevented from being concentrated on the edge portions of the support beam.

According to various preferred embodiments of the present invention, since the balance in rotation of the rotating weight can be ensured by providing only one support beam in effect to support the rotating weight, the rotating weight is not rotated even upon the action of a translational inertial force. In addition, since the number of support beams is reduced in effect, the stress generated in the support beam increases. As a result, the detection sensitivity of the angular acceleration is significantly improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A-4F are explanatory views to explain an operation of the detection circuit.

FIGS. 5A-5C are explanatory views to explain a finite element analysis for the configuration of the first preferred embodiment and comparative configurations.

DETAILED DESCRIPTION OF THE PREFERRED EMBODIMENTS

In the following description, it is assumed that the direction of thickness of the angular acceleration detection device is defined as a direction of a Z-axis of an orthogonal coordinate system, the direction of length of a support beam is defined as a Y-axis direction, and the direction of width of the support beam is defined as an X-axis direction.

First Preferred Embodiment

Figure 1A:
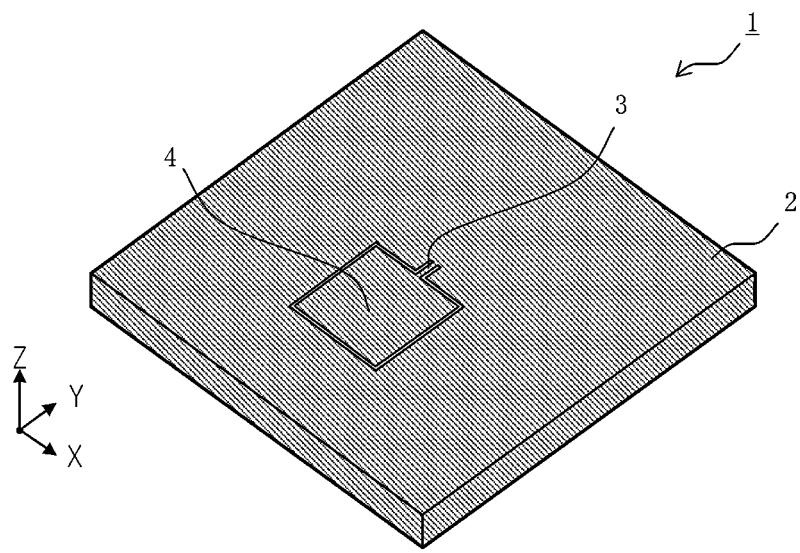
FIGS. 1A and 1B are explanatory views to explain a configuration of an angular acceleration detection device according to a first preferred embodiment of the present invention.
Figure 1B:
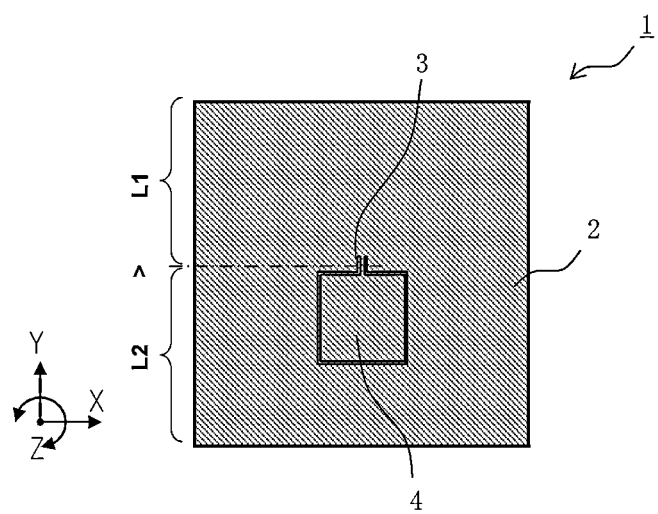

FIG. 1A is a perspective view illustrating a configuration of an angular acceleration detection device 1 according to a first preferred embodiment of the present invention, and FIG. 1B is a plan view of the angular acceleration detection device 1.

The angular acceleration detection device 1 preferably includes an integral rectangular or substantially rectangular plate provided with a groove penetrating through the plate between upper and lower surfaces thereof, which are perpendicular to the Z-axis. The angular acceleration detection device 1 includes a rotating weight 2, a support beam 3, a fixed portion 4, and a detection portion 5 (not illustrated in FIG. 1). The plate is obtained preferably by cutting a semiconductor wafer with surface machining. In the field of surface machining of a semiconductor wafer, performance of machining techniques and machining apparatuses are highly developed, and a plurality of plates can be efficiently manufactured with high accuracy.

The fixed portion 4 preferably has a rectangular or substantially rectangular shape and is disposed at a position deviated from the center of an X-Y plane of the plate. At least one of upper and lower surfaces of the fixed portion 4 is fixed to a housing (not illustrated). The rotating weight 2 is constituted by forming, in the plate, a rectangular or substantially rectangular opening accommodating the fixed portion 4 such that the rotating weight 2 surrounds the fixed portion 4 in the X-Y plane. The support beam 3 is disposed to extend in a rectangular or substantially rectangular shape in the positive direction of a Y-axis between the fixed portion 4 and the rotating weight 2 in the X-Y plane. The support beam 3 supports the rotating weight 2 to the fixed portion 4 such that the upper and lower surfaces of the rotating weight 2 are held in a state floating from the housing (not illustrated). The detection portion 5 (not illustrated FIG. 1) outputs a detection signal corresponding to stress acting on the support beam 3.

Respective center positions of the support beam 3 and the fixed portion 4 in an X-axis coordinate are aligned with a center position of the rotating weight 2. A center position of the fixed portion 4 in a Y-axis coordinate is deviated from the center position of the rotating weight 2 in the negative direction of the Y-axis. The center position of the support beam 3 in the Y-axis coordinate is deviated from the center position of the rotating weight 2 in the positive direction of the Y-axis, and it is aligned with a gravity center of the rotating weight 2 in the Y-axis coordinate.

In the angular acceleration detection device 1 constituted as described above, when a rotational inertial force acts about the Z-axis, the rotating weight 2 is caused to rotate (oscillate) in the X-Y plane about the Z-axis with respect to the fixed portion 4. As a result, an angular acceleration is detected with the Z-axis being a detection axis.

Figure 2:
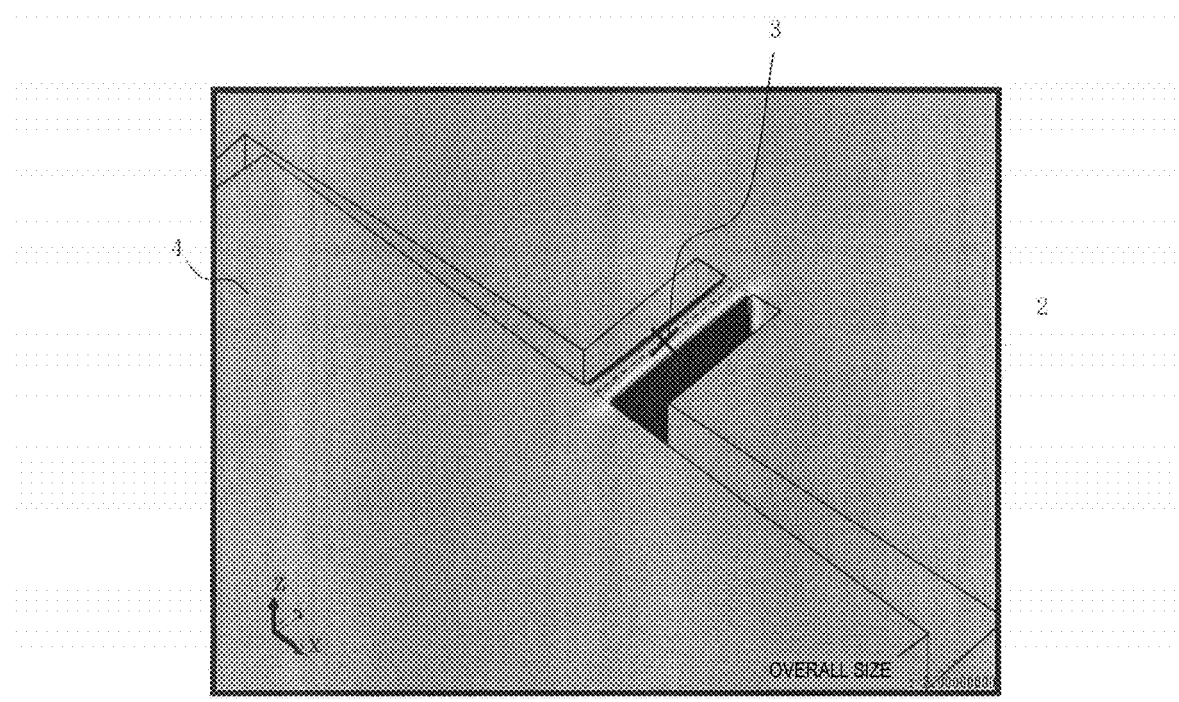
FIG. 2 is an explanatory view to explain a simulation of a stress distribution in the angular acceleration detection device.

FIG. 2 is an explanatory view to explain a stress distribution generated in the support beam 3 when the rotational inertial force acts about the Z-axis. FIG. 2 illustrates a state where the angular acceleration detection device 1 is rotated clockwise when viewed from the positive direction of the Z-axis.

In such a case, the rotating weight 2 is caused to rotate counterclockwise with respect to the fixed portion 4 being a reference when viewed from the positive direction of the Z-axis, such that the rotational inertial force acts on the support beam 3 counterclockwise when viewed from the positive direction of the Z-axis. In the support beam 3, therefore, compressive stress acts in a region near its lateral surface in the negative side of the X-axis direction, and tensile stress acts in a region near its lateral surface in the positive side of the X-axis direction. Hence the support beam 3 flexes in the negative direction of the X-axis. A center plane (denoted by a one-dot-chain line) of the support beam 3 in the direction of width thereof serves as a boundary between the tensile stress and the compressive stress, thus providing a neutral plane where no stress acts. A gravity center position (denoted by X) of the rotating weight 2 is aligned with the above-mentioned center plane when viewed in the X-Y plane.

Figure 3A:
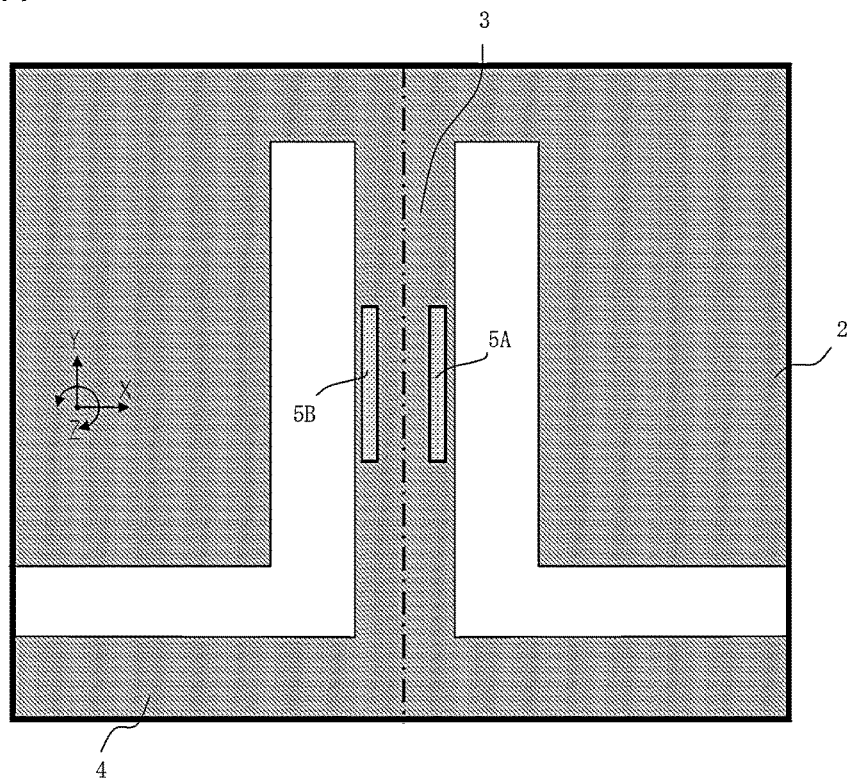
FIGS. 3A and 3B are explanatory views to explain a configuration of a detection circuit in the angular acceleration detection device.
Figure 3B:
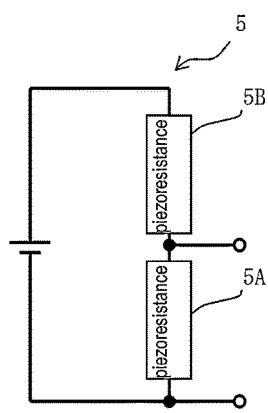

FIGS. 3A and 3B are explanatory views to explain a configuration of the detection portion 5. FIG. 3A is a plan view of the support beam 3 and thereabout, and FIG. 3B is a circuit diagram of the detection portion 5.

The detection portion 5 includes piezoresistances 5A and 5B located on an upper surface of the support beam 3 and extending in the Y-axis direction. The piezoresistances 5A and 5B can be each formed at a precise position in a precise shape with high accuracy by forming them on a semiconductor wafer with semiconductor processes. The piezoresistances 5A and 5B are arranged parallel or substantially parallel to each other on both the sides of the neutral plane of the support beam 3. The piezoresistances 5A and 5B are connected in series and are further connected to a constant voltage source. Because the compressive stress acts in a region on one side with respect to the neutral plane of the support beam 3 being a boundary and the tensile stress acts in a region on the other side, the piezoresistances 5A and 5B are caused to extend and contract in reversed relation. When the piezoresistances 5A and 5B each extends, its resistance value increases, and when each contracts, its resistance value decreases. Therefore, a voltage ratio divided by the piezoresistances 5A and 5B also varies, such that the stress acting on the support beam 3 can be detected from a voltage across the piezoresistance 5A or the piezoresistance 5B.

FIGS. 4A-4F are explanatory views to explain deformations of the support beam and changes of the piezoresistances, which are caused by the action of various types of accelerations.

FIG. 4A illustrates a state where a rotational inertial force acts on the angular acceleration detection device 1 counterclockwise when viewed from the positive direction of the Z-axis. In such a state, the support beam 3 is caused to curve in the X-Y plane such that the piezoresistance 5A extends and the piezoresistance 5B contracts. A resistance value of the piezoresistance 5A, which has extended, increases, and a resistance value of the piezoresistance 5B, which has contracted, decreases. As a result, in the detection portion 5, the voltage across the piezoresistance 5A increases, and the voltage across the piezoresistance 5B decreases.

FIG. 4B illustrates a state where a rotational inertial force acts on the angular acceleration detection device 1 counterclockwise when viewed from the positive direction of the X-axis. In such a state, the support beam 3 is caused to curve in a Y-Z plane such that both the piezoresistances 5A and 5B contract and their resistance values decrease. As a result, in the detection portion 5, a change of the resistance value of the piezoresistance 5A and a change of the resistance value of the piezoresistance 5B cancel each other, such that the divided voltages are maintained.

FIG. 4C illustrates a state where a rotational inertial force acts on the angular acceleration detection device 1 counterclockwise when viewed from the positive direction of the Y-axis. In such a state, the support beam 3 is caused to twist in an X-Z plane. With the twisting of the support beam 3, the piezoresistances 5A and 5B are also caused to twist in a similar way such that changes of their resistance values are equal to each other. As a result, in the detection portion 5, a change of the resistance value of the piezoresistance 5A and a change of the resistance value of the piezoresistance 5B cancel each other, such that the divided voltages are maintained.

FIG. 4D illustrates a state where a translational inertial force acts on the angular acceleration detection device 1 in the positive direction of the X-axis. In such a state, the support beam 3 is caused to curve in the X-Y plane. With the curving of the support beam 3, the piezoresistances 5A and 5B are also caused to curve in a similar way such that changes of their resistance values are equal to each other. As a result, in the detection portion 5, a change of the resistance value of the piezoresistance 5A and a change of the resistance value of the piezoresistance 5B cancel each other, such that the divided voltages are maintained.

FIG. 4E illustrates a state where a translational inertial force acts on the angular acceleration detection device 1 in the positive direction of the Y-axis. In such a state, the support beam 3 is caused to extend in the Y-axis direction. With the extension of the support beam 3, the piezoresistances 5A and 5B are also caused to extend in a similar way such that changes in their resistance values are equal to each other. As a result, in the detection portion 5, a change in the resistance value of the piezoresistance 5A and a change in the resistance value of the piezoresistance 5B cancel each other, such that the divided voltages are maintained.

FIG. 4F illustrates a state where a translational inertial force acts on the angular acceleration detection device 1 in the positive direction of the Z-axis. In such a state, the support beam 3 is caused to curve in the Y-Z plane. With the curving of the support beam 3, the piezoresistances 5A and 5B are also caused to extend and contract in a similar way such that changes of their resistance values are equal to each other. As a result, in the detection portion 5, a change of the resistance value of the piezoresistance 5A and a change of the resistance value of the piezoresistance 5B cancel each other, such that the divided voltages are maintained.

Thus, according to the angular acceleration detection device 1, the output voltage is changed only in the state where the rotational inertial force acts about the Z-axis.

The magnitude of the stress acting on the support beam 3 will be described below.

As expressed in the following Formula 1, a rotational angle θ of the rotating weight 2 about the Z-axis with respect to the fixed portion 4 is in proportion to an angular acceleration β about the Z-axis and is in reverse proportion to the square of a natural frequency $f_0$ of a structure, which is constituted by the rotating weight 2, the support beam 3, and the fixed portion 4, about the Z-axis.

$$\theta = \frac{\beta}{(2\pi f_0)^2} \quad \text{Formula 1}$$

To hold constant a response frequency range in the angular acceleration detection device 1, the natural frequency $f_0$ is preferably selected as an appropriate setting value. Therefore, when the natural frequency $f_0$ is determined, a rotational angle θ/β per unit of angular acceleration is uniquely determined as expressed in the following Formula 2.

$$\frac{\theta}{\beta} = \frac{1}{(2\pi f_0)^2} \quad \text{Formula 2}$$

The natural frequency $f_0$ depends on a plurality of shape parameters of the structure constituted by the rotating weight 2, the support beam 3, and the fixed portion 4. Even in structures where the numbers of support beams are different, their natural frequencies $f_0$ can be made matched with each other by adjusting respective dimensions of individual components. Accordingly, in structures having the same natural frequency $f_0$, rotational angles θ are equal to each other when the angular acceleration acts on the structures in the same magnitude.

Taking into account the above-described point, the following description is provided concerning the results of analyzing the dimensions of individual components and the performance for each of structures of angular acceleration detection devices when the number n of support beams is made different and the natural frequency $f_0$ is set to be the same.

FIG. 5A is a plan view of the angular acceleration detection device 10A according to one comparative configuration. The angular acceleration detection device 10A includes two support beams and has a symmetrical shape with the gravity center position of the rotating weight being a center.

FIG. 5B is a plan view of the angular acceleration detection device 10B according to another comparative configuration. The angular acceleration detection device 10B includes four support beams and has a symmetrical shape with the gravity center position of the rotating weight being a center.

In analysis examples of those configurations, each angular acceleration detection device has the same external dimensions of 2 mm×2 mm×200 µm as those of the angular acceleration detection device 1 according to the present preferred embodiment. The rotating weight 2 and the fixed portion 4 have the same shapes as those in the present preferred embodiment, respectively. The natural frequency $f_0$ is set to the same value, i.e., 2.0 kHz, by adjusting the dimensions of the support beam.

FIG. 5C is a table indicating the dimensions of individual components and the performance in each of the analysis examples.

In an example of the angular acceleration detection device 1 according to the preferred embodiment, the number n of support beams is 1, a length Ly of the support beam (i.e., the dimension thereof in the Y-axis direction) is 110 µm, and a width Lx of the support beam (i.e., the dimension thereof in the X-axis direction) is 20 µm, for example. Based on these conditions, the natural frequency $f_0$ is set to 2.0 kHz, for example.

In the angular acceleration detection device 10A according to the one comparative configuration, the number n of support beams is 2, the length Ly of the support beam (i.e., the dimension thereof in the Y-axis direction) is 441 µm, and the width Lx of the support beam (i.e., the dimension thereof in the X-axis direction) is 10 µm. Based on these conditions, the natural frequency $f_0$ is set to 2.0 kHz.

In the angular acceleration detection device 10B according to the other comparative configuration, the number n of support beams is 4, the length Ly of the support beam (i.e., the dimension thereof in the Y-axis direction) is 640 µm, and the width Lx of the support beam (i.e., the dimension thereof in the X-axis direction) is 10 µm. Based on these conditions, the natural frequency $f_0$ is set to 2.0 kHz.

Thus, when the rotational angles θ/β per unit of angular acceleration are made equal to each other by setting the respective natural frequency $f_0$ to the same value in the angular acceleration detection devices, the length of the support beam becomes shorter as the number of support beams 3 decreases.

Consider a flexural angle θ' of the support beam here, the flexural angle θ' of the support beam is given by the product of the length Ly of the support beam and a flexural curvature 1/ρ of the support beam as expressed in the following Formula 3.

$$\theta' \approx L_Y \cdot \frac{1}{\rho} \qquad \text{Formula 3}$$

On the other hand, stress σ generated near each of the piezoresistances 5A and 5B in the support beam 3 is given by the product of a distance x from the neutral plane of the support beam to each of the piezoresistances 5A and 5B, the flexural curvature 1/ρ of the support beam, and a longitudinal elastic modulus E of material of the support beam as expressed in the following Formula 4.

$$\sigma \approx x \cdot \frac{1}{\rho} \cdot E \qquad \text{Formula 4}$$

From the above two formulae, the following Formula 5 is obtained.

$$\frac{\sigma}{\theta'} \approx \frac{x}{L_Y} \cdot E \qquad \text{Formula 5}$$

Thus, the stress σ generated in the support beam 3 per the flexural angle θ' of the support beam can be increased by setting the length Ly of the support beam to be shorter and the distance x from the neutral plane to each of the piezoresistances 5A and 5B to be larger.

If it is assumed that the flexural angle θ' of the support beam and the rotational angle θ of the rotating weight 2 are equal to each other, the following formula is obtained from the above Formulae 2 and 5.

$$\frac{\sigma}{\beta} \approx \frac{x}{L_Y} \cdot \frac{E}{(2\pi f_0)^2} \qquad \text{Formula 6}$$

Thus, the stress σ/β per unit of angular acceleration generated near each of the piezoresistances 5A and 5B in the support beam 3 can also be increased by setting the length Ly of the support beam to be shorter and the distance x from the neutral plane to each of the piezoresistances 5A and 5B to be larger. That point can also be confirmed from the results of the finite element analysis, indicated in FIG. 5C. More specifically, in the angular acceleration detection device 1 according to the present preferred embodiment, the length Ly of the support beam is shortest, and the stress acting on the support beam 3 has a maximum value of about 73 Pa (rad/s$^2$) per unit of angular acceleration, for example. In the angular acceleration detection device 10A according to the one comparative configuration, the length Ly of the support beam is longer than that in the preferred embodiment, and the stress acting on the support beam 3 has a maximum value of 49 Pa (rad/s$^2$) per unit of angular acceleration. In the angular acceleration detection device 10B according to the other comparative configuration, the length Ly of the support beam is even longer than that in the preferred embodiment, and the stress acting on the support beam 3 has a maximum value of 29 Pa (rad/s$^2$) per unit of angular acceleration.

As discussed above, with the angular acceleration detection device 1 of the present preferred embodiment, since the number of support beams is one and the stress acting on the support beam 3 is increased, the rotational inertial force exerted on the support beam from the rotating weight is more efficiently concentrated on the support beam, and the stress generated in the support beam is increased. Hence, respective deformations of the piezoresistances 5A and 5B are increased, such that higher detection sensitivity is obtained.

While a preferred embodiment has been described in connection with an example in which the rotating weight 2 preferably has a rectangular or substantially rectangular external shape when viewed from the Z-axis direction, the rotating weight 2 may have any of other suitable external shapes, such as a circular or substantially circular or star-shaped. Furthermore, while the internal shape of the rotating weight 2 preferably is rectangular or substantially rectangular in the above-described preferred embodiment, the rotating weight 2 may have any of other suitable internal shapes. Similarly, while the external shape of the fixed portion 4 preferably is rectangular or substantially rectangular in the above-described preferred embodiment, the fixed portion 4 may have any of other suitable external shapes. In addition, while the shape of the support beam preferably is rectangular or substantially rectangular in the above-described preferred embodiment, the support beam may have any of other suitable shapes.

Moreover, while a preferred embodiment has been described in connection with an example in which the individual components are fabricated by the surface machining of the semiconductor wafer and the detection portion 5 is constituted by the piezoresistances 5A and 5B, the angular acceleration detection device may be of any suitable type regardless of the detection principle, the manufacturing method, and the component materials insofar as the stress can be finally converted to an electrical signal.

Second Preferred Embodiment

Figure 6A:
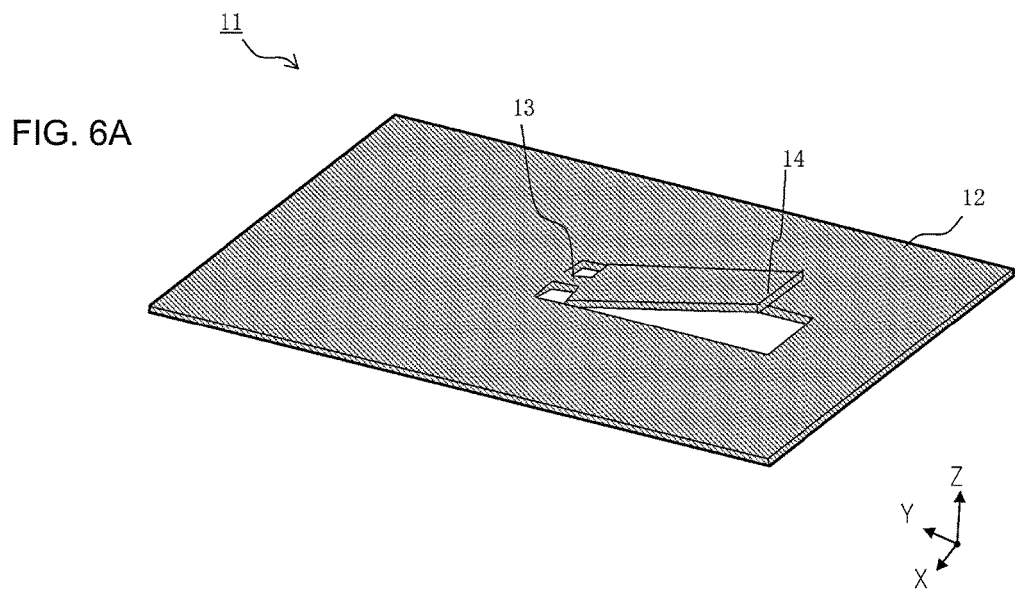
FIGS. 6A and 6B are explanatory views to explain a configuration of an angular acceleration detection device according to a second preferred embodiment of the present invention.
Figure 6B:
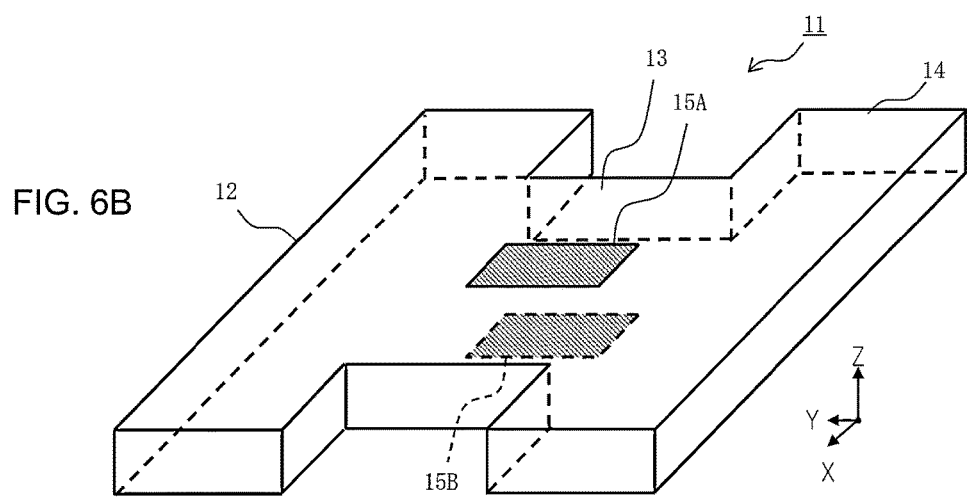

FIG. 6A is a perspective view of an angular acceleration detection device 11, in a deformed state, according to a second preferred embodiment of the present invention. FIG. 6B is a schematic view illustrating a structure around a support beam 13 of the angular acceleration detection device 11.

The angular acceleration detection device 11 includes a rotating weight 12, a support beam 13, a fixed portion 14, and a detection portion 15 (not illustrated). The rotating weight 12, the support beam 13, and the fixed portion 14 can be constituted substantially in the same structures as those in the first preferred embodiment. The second preferred embodiment is mainly different from the first preferred embodiment in that the piezoresistances 5A and 5B disposed in the detection portion 15 (not illustrated) are arranged at upper and lower surfaces of the support beam 13, respectively, and that the angular acceleration is detected with the X-axis serving as the detection axis.

Figure 7:
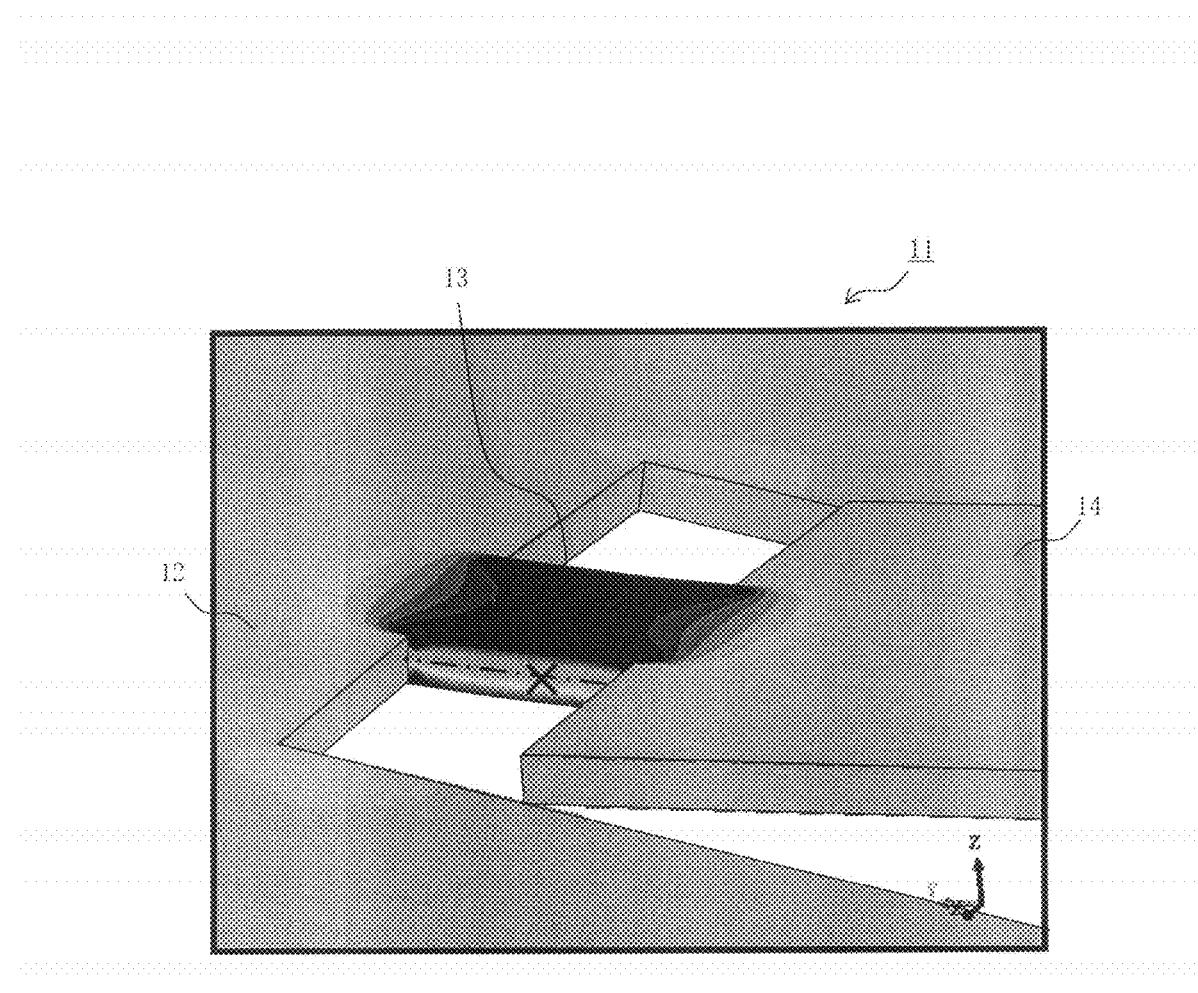
FIG. 7 is an explanatory view to explain a simulation of a stress distribution in the angular acceleration detection device.

FIG. 7 is an explanatory view to explain a stress distribution generated in the support beam 13 when the rotational inertial force acts about the X-axis. FIG. 7 illustrates a state where the angular acceleration detection device 11 is rotated counterclockwise when viewed from the positive direction of the X-axis.

In such a case, the rotating weight 12 is caused to rotate clockwise with respect to the fixed portion 14 being a reference when viewed from the positive direction of the X-axis, such that the rotational inertial force acts on the support beam 13 clockwise when viewed from the positive direction of the X-axis. In the support beam 13, therefore, compressive stress acts in a region near its upper surface in the positive side of the Z-axis direction, and tensile stress acts in a region near its lower surface in the negative side of the Z-axis direction. Hence the support beam 13 flexes in the positive direction of the Z-axis.

On that occasion, a center plane of the support beam 13 in the direction of thickness thereof serves as a boundary between the tensile stress and the compressive stress, thus providing a neutral plane (denoted by a one-dot-chain line in FIG. 7) where no stress acts. Moreover, a gravity center (denoted by X in FIG. 7) of the rotating weight 12 is positioned on the above-mentioned neutral plane when viewed in the Y-Z plane. As a result, the angular acceleration about the X-axis can be detected by the detection portion 15 (not illustrated) with high detection sensitivity while balance in rotation of the rotating weight 12 about the X-axis is ensured. Thus, the angular acceleration detection device can also be constituted as described above.

Third Preferred Embodiment

Figure 8:
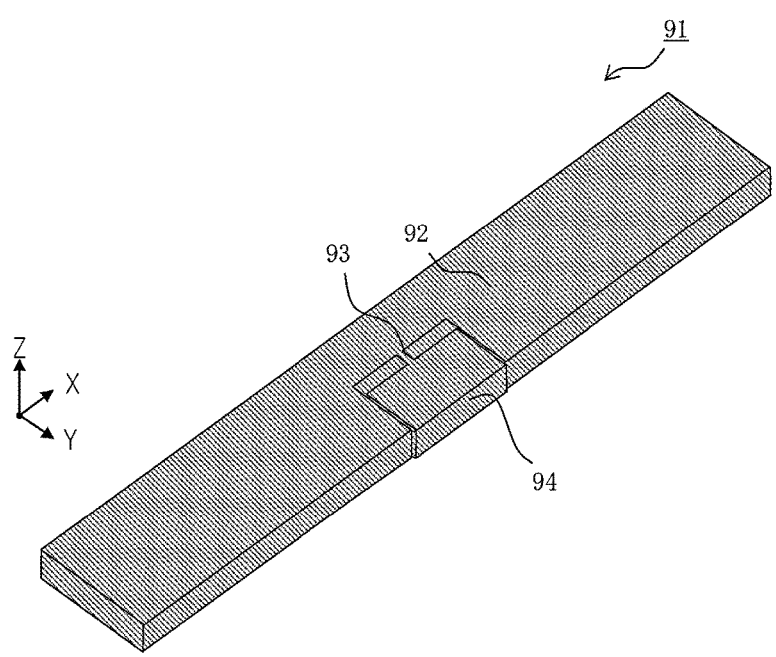
FIG. 8 is an explanatory view of an angular acceleration detection device according to a third preferred embodiment of the present invention.

FIG. 8 is a perspective view illustrating a configuration of an angular acceleration detection device 91 according to a third preferred embodiment of the present invention.

The angular acceleration detection device 91 preferably includes a rectangular or substantially rectangular plate provided with a groove penetrating through the plate between upper and lower surfaces thereof, which are perpendicular or substantially rectangular to the Z-axis. The angular acceleration detection device 91 includes a rotating weight 92, a support beam 93, a fixed portion 94, and a detection portion 95 (not illustrated). The rotating weight 92 preferably has a substantially elongated C-shaped configuration that is opened in the positive direction of the Y-axis. A long axis of the rotating weight 92 is set to be the X-axis direction, and a short axis thereof is set to be the Y-axis direction. The support beam 93 has a center aligned with a gravity center position of the rotating weight 92. A direction of length of the support beam 93 is set to be the Y-axis direction, and a direction of width thereof is set to be the X-axis direction. The fixed portion 94 is disposed in an opening of the rotating weight 92, and at least one of upper and lower surfaces of the fixed portion 94 is fixed to a housing (not illustrated). Thus, the fixed portion 94 supports the rotating weight 92 through the support beam 93.

In the angular acceleration detection device 91 constituted as described above, when the rotational inertial force acts about the Z-axis, the rotating weight 92 is caused to rotate (oscillate) about the Z-axis with respect to the fixed portion 94 in the X-Y plane, such that the angular acceleration can be detected with the Z-axis serving as the detection axis.

Furthermore, since the rotating weight 92 has the shape having the long axis set to be the X-axis direction, a moment of inertia about the Z-axis becomes larger. In comparison with the case where the rotating weight has a square external shape, therefore, a larger rotational inertial force per unit of angular acceleration can be obtained with the same area occupied by each device.

Accordingly, the support beam 93 can be provided in the fatter and shorter form while the natural frequency of the angular acceleration detection device 91 is kept the same. As a result, the detection sensitivity of angular acceleration is significantly increased.

Fourth Preferred Embodiment

Figure 9A:
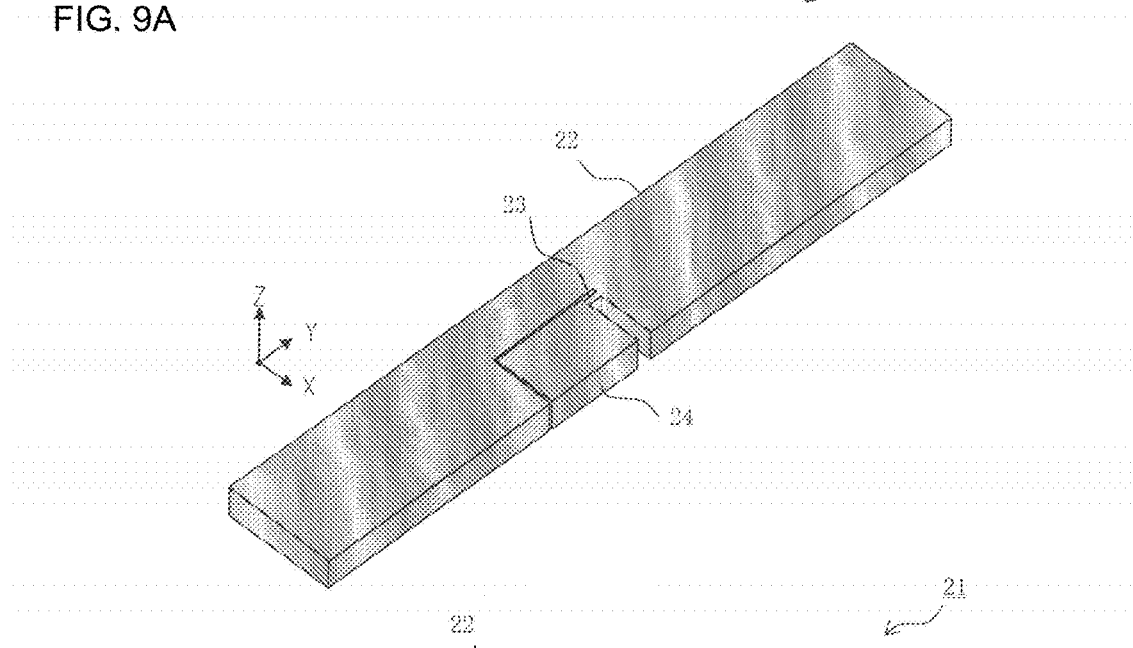
FIGS. 9A and 9B are explanatory views of an angular acceleration detection device according to a fourth preferred embodiment of the present invention.

FIG. 9A is a perspective view of an angular acceleration detection device 21 according to a fourth preferred embodiment of the present invention.

The angular acceleration detection device 21 preferably includes a rectangular or substantially rectangular plate provided with a groove penetrating through the plate between upper and lower surfaces thereof, which are perpendicular or substantially rectangular to the Z-axis. The angular acceleration detection device 21 includes a rotating weight 22, a support beam 23, a fixed portion 24, and a detection portion 25 (not illustrated). The rotating weight 22 preferably has a substantially elongated C-shaped configuration that is opened in the positive direction of the X-axis. A long axis of the rotating weight 22 is set to be the Y-axis direction, and a short axis thereof is set to be the X-axis direction. The support beam 23 has a center aligned with a gravity center position of the rotating weight 22. A direction of length of the support beam 23 is set to be the Y-axis direction, and a direction of width thereof is set to be the X-axis direction. The fixed portion 24 is disposed in an opening of the rotating weight 22, and at least one of upper and lower surfaces of the fixed portion 24 is fixed to a housing (not illustrated). Thus, the fixed portion 24 supports the rotating weight 22 through the support beam 23.

Figure 9B:
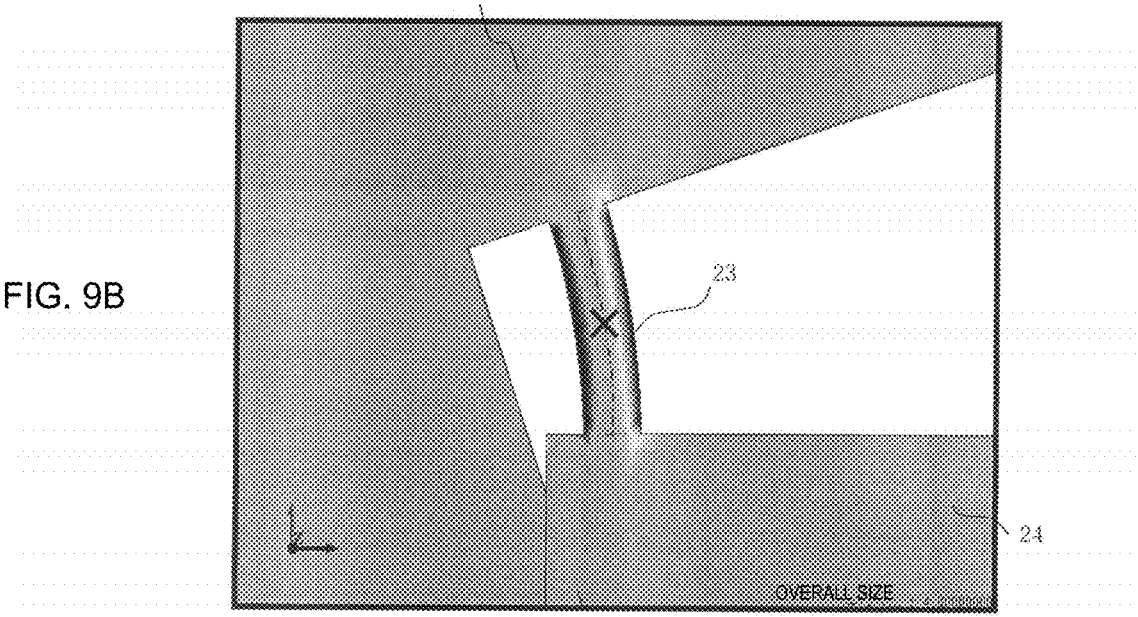

FIG. 9B is an explanatory view to explain a stress distribution generated in the support beam 23 when the rotational inertial force acts about the Z-axis. FIG. 9B illustrates a state where the angular acceleration detection device 21 is rotated clockwise when viewed from the positive direction of the Z-axis.

In such a case, the rotating weight 22 is caused to rotate counterclockwise with respect to the fixed portion 24 being a reference when viewed from the positive direction of the Z-axis, such that the rotational inertial force acts on the support beam 23 counterclockwise when viewed from the positive direction of the Z-axis. In the support beam 23, therefore, compressive stress acts in a region near its lateral surface in the negative side of the X-axis direction, and tensile stress acts in a region near its lateral surface in the positive side of the X-axis direction. Hence the support beam 23 flexes in the negative direction of the X-axis.

On that occasion, a center plane of the support beam 13 in the direction of width thereof serves as a neutral plane (denoted by a one-dot-chain line in FIG. 9B). Moreover, a gravity center (denoted by X in FIG. 9B) of the rotating weight 22 is positioned on the above-mentioned neutral plane when viewed in the X-Y plane. As a result, the angular acceleration about the Z-axis can be detected by the detection portion 25 (not illustrated) with high detection sensitivity while balance in rotation of the rotating weight 22 about the Z-axis is ensured.

In the angular acceleration detection device 21 constituted as described above, since the rotating weight 22 has the shape having the long axis set to be the Y-axis direction, a moment of inertia about the Z-axis becomes larger. In comparison with the case where the rotating weight has a square external shape, therefore, a larger rotational inertial force per unit of angular acceleration can be obtained with the same area occupied by each device.

Accordingly, the support beam can be provided in the fatter and shorter form while the natural frequency of the angular acceleration detection device 21 is kept the same. As a result, the detection sensitivity of angular acceleration is significantly increased.

In addition, a moment of inertia of the rotating weight 22 about the X-axis is also large, and the rotational inertial force caused by disturbance vibration about the short axis of the rotating weight 22 is increased. In the third preferred embodiment described above, because the direction of length of the support beam is aligned with the direction of the short axis of the rotating weight, the rotational inertial force about the short axis of the rotating weight causes the support beam 93 to twist. In the fourth preferred embodiment, however, because the direction of length of the support beam is aligned with the direction of the long axis of the rotating weight, the rotational inertial force about the short axis of the rotating weight causes the support beam 23 to curve instead of twisting. A large extent of twisting of the support beam leads to a high possibility that stress may concentrate in edge portions of the support beam 23 and the support beam 23 may break. In contrast, by using the arrangement like the fourth preferred embodiment in which the direction of length of the support beam is aligned with the direction of the long axis of the rotating weight, it is possible to prevent the support beam from twisting to a large extent, and to increase the impact resistance performance of the angular acceleration detection device.

Fifth Preferred Embodiment

Figure 10:
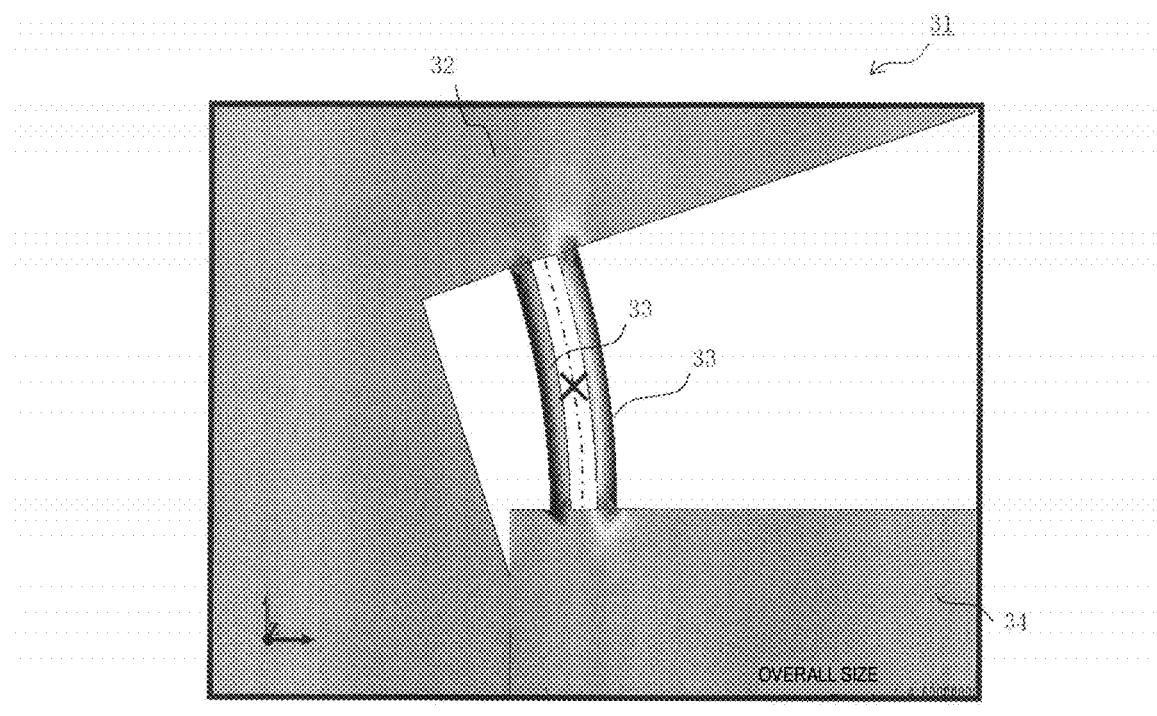
FIG. 10 is an explanatory view of an angular acceleration detection device according to a fifth preferred embodiment of the present invention.

FIG. 10 is an explanatory view to explain a stress distribution in an angular acceleration detection device 31 according to a fifth preferred embodiment of the present invention in a state under action of a rotational inertial force.

The angular acceleration detection device 31 includes a rotating weight 32, support beams 33, a fixed portion 34, and a detection portion 35 (not illustrated). The rotating weight 32, the fixed portion 34, and the detection portion 35 (not illustrated) preferably have substantially the same structures as those in the fourth preferred embodiment. The fifth preferred embodiment is different from the fourth preferred embodiment mainly in including two support beams 33 that are disposed parallel or substantially parallel to each other on both the sides of a gravity center (denoted by X in FIG. 10) of the rotating weight 32 with a certain spacing between them.

In the above-described structure, when an angular acceleration acts about the Z-axis, stresses acting on the two support beams 33 have polarities reversed relative to each other such that one of the stresses is tensile stress and the other is compressive stress. Furthermore, a neutral plane (denoted by a one-dot-chain line in FIG. 10) between the respective stresses acting on the two support beams 33 is aligned with an intermediate position between the two support beams 33, and a gravity center (denoted by X in FIG. 10) of the rotating weight is positioned on the above-mentioned neutral plane. As a result, the angular acceleration about the Z-axis can be detected by the detection portion 35 (not illustrated) with high detection sensitivity while balance in rotation of the rotating weight 32 about the Z-axis is ensured. Thus, the angular acceleration detection device can also be constituted as described above.

Sixth Preferred Embodiment

Figure 11:
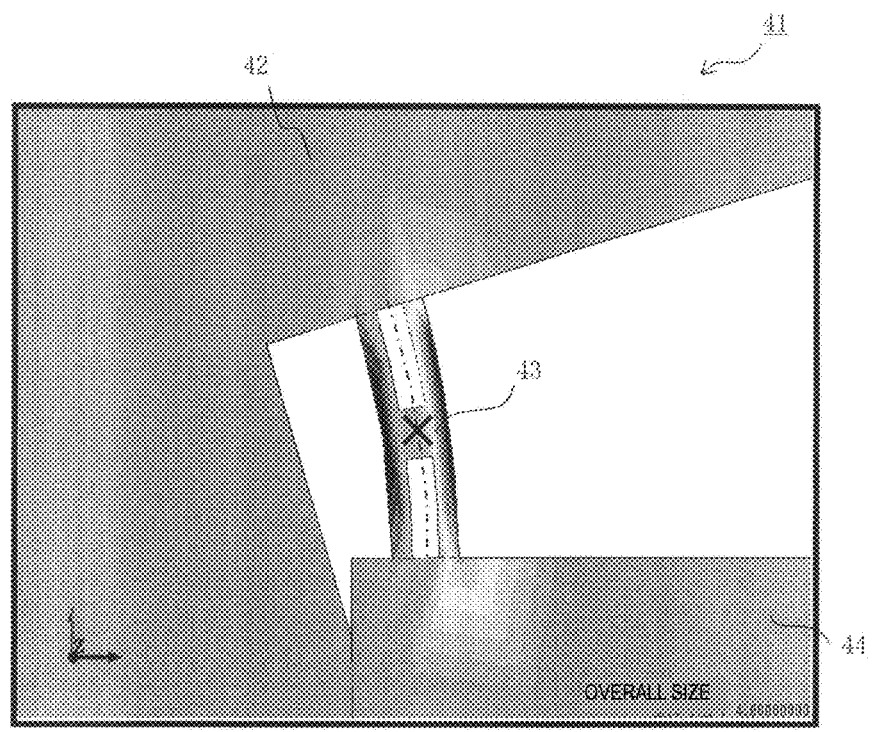
FIG. 11 is an explanatory view of an angular acceleration detection device according to a sixth preferred embodiment of the present invention.

FIG. 11 is an explanatory view to explain a stress distribution in an angular acceleration detection device 41 according to a sixth preferred embodiment of the present invention in a state under action of a rotational inertial force.

The angular acceleration detection device 41 includes a rotating weight 42, a support beam 43, a fixed portion 44, and a detection portion 45 (not illustrated). The rotating weight 42, the fixed portion 44, and the detection portion 45 (not illustrated) preferably have substantially the same structures as those in the fourth preferred embodiment. The sixth preferred embodiment is different from the fourth preferred embodiment mainly in that the support beam 43 preferably has an H-shaped or substantially H-shaped configuration and has a center aligned with a gravity center position of the rotating weight 42 with a direction of length thereof set to be the Y-axis direction and a direction of width thereof set to be the X-axis direction.

In the above-described structure, when an angular acceleration acts about the Z-axis, compressive stress acts in a region near a lateral surface of the support beam 43 in the negative side of the X-axis direction, and tensile stress acts in a region near a lateral surface of the support beam 43 in the positive side of the X-axis direction. Hence the support beam 43 flexes in the negative direction of the X-axis.

On that occasion, a gravity center (denoted by X in FIG. 11) of the rotating weight 42 is positioned on a neutral plane (denoted by a one-dot-chain line in FIG. 11) of the support beam when viewed in the X-Y plane. As a result, the angular acceleration about the Z-axis is detected with high detection sensitivity while balance in rotation of the rotating weight 42 about the Z-axis is ensured. From the finite element analysis, it is confirmed that the stresses in regions near both the lateral surfaces of the support beam 43 increase at a position nearer to the center of the support beam 43 in the Y-axis direction. It is hence thought that the detection sensitivity of angular acceleration can be further increased by setting a stress detection position of the detection portion 45 to be located in those regions.

Seventh Preferred Embodiment

Figure 12:
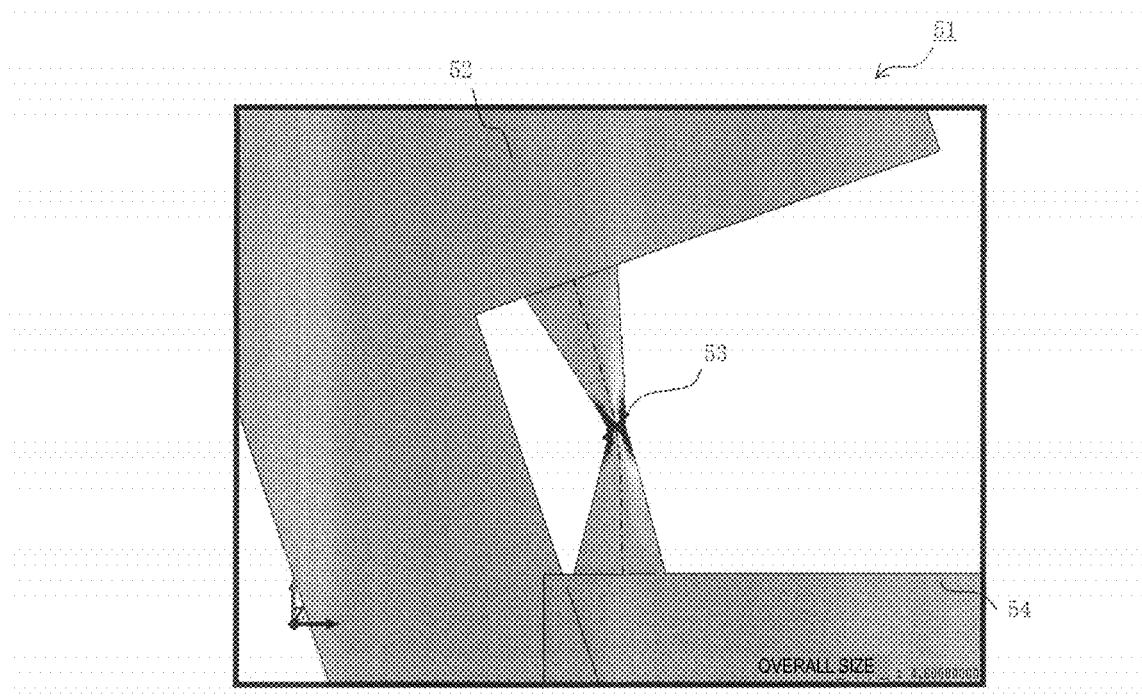
FIG. 12 is an explanatory view of an angular acceleration detection device according to a seventh preferred embodiment of the present invention.

FIG. 12 is an explanatory view to explain a stress distribution in an angular acceleration detection device 51 according to a seventh preferred embodiment in a state under action of a rotational inertial force.

The angular acceleration detection device 51 includes a rotating weight 52, a support beam 53, a fixed portion 54, and a detection portion 55 (not illustrated). The rotating weight 52, the fixed portion 54, and the detection portion 55 (not illustrated) preferably have substantially the same structures as those in the fourth preferred embodiment. The seventh preferred embodiment is different from the fourth preferred embodiment mainly in that the support beam 53 is constituted in such a tapered shape as gradually narrowing toward a center and widening toward both ends thereof, and that a center of the support beam is aligned with a gravity center position of the rotating weight 52 with a direction of length thereof set to be the Y-axis direction and a direction of width thereof set to be the X-axis direction.

In the above-described structure, when an angular acceleration acts about the Z-axis, compressive stress acts in a region near a lateral surface of the support beam 53 in the negative side of the X-axis direction, and tensile stress acts in a region near a lateral surface of the support beam 53 in the positive side of the X-axis direction. Hence the support beam 53 flexes in the negative direction of the X-axis.

On that occasion, a gravity center (denoted by X in FIG. 12) of the rotating weight 52 is positioned on a neutral plane (denoted by a one-dot-chain line in FIG. 12) of the support beam when viewed in the X-Y plane. As a result, the angular acceleration about the Z-axis is detected with high detection sensitivity while balance in rotation of the rotating weight 52 about the Z-axis is ensured. From the finite element analysis, it is confirmed that the stress concentrates in a region near the center of the support beam 53 in the Y-axis direction. It is hence thought that the detection sensitivity of angular acceleration can be further increased by setting a stress detection position of the detection portion 55 to be located in such a region.

Eighth Preferred Embodiment

Figure 13:
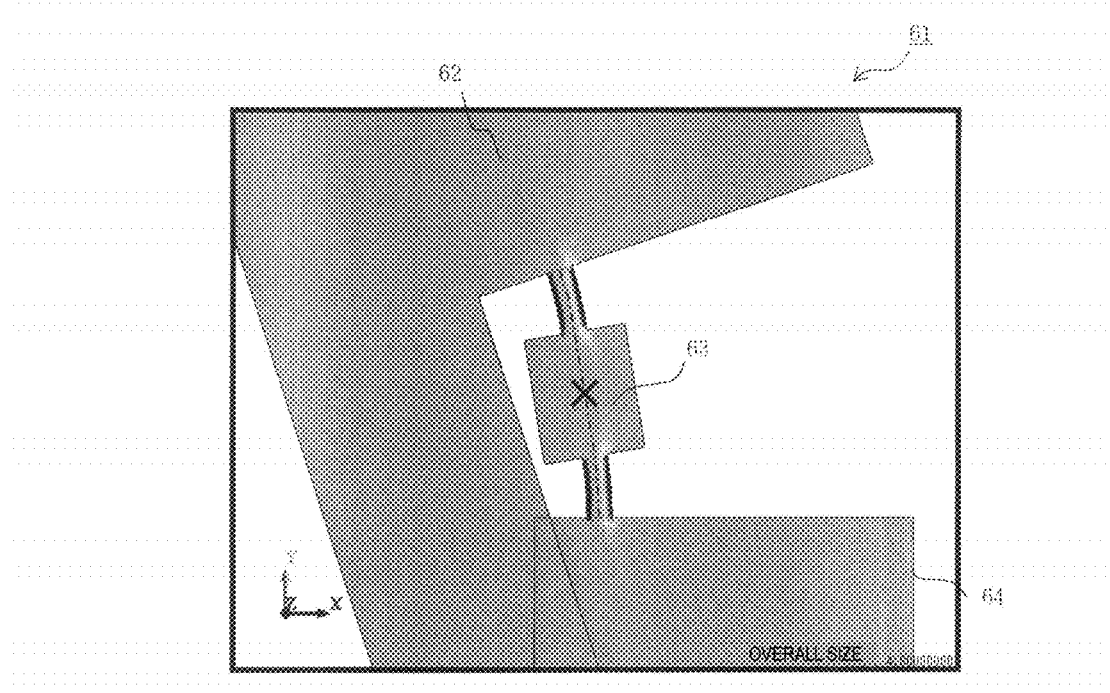
FIG. 13 is an explanatory view of an angular acceleration detection device according to an eighth preferred embodiment of the present invention.

FIG. 13 is an explanatory view to explain a stress distribution in an angular acceleration detection device 61 according to an eighth preferred embodiment of the present invention in a state under action of a rotational inertial force.

The angular acceleration detection device 61 includes a rotating weight 62, a support beam 63, a fixed portion 64, and a detection portion 65 (not illustrated). The rotating weight 62 and the fixed portion 64 preferably have substantially the same structures as those in the fourth preferred embodiment. The eighth preferred embodiment is mainly different from the fourth preferred embodiment in that the support beam 63 is constituted in a multi-stepped shape having a wide central portion and a narrow both end portions, and that a center of the support beam is aligned with a gravity center position of the rotating weight 62 with a direction of length thereof set to be the Y-axis direction and a direction of width thereof set to be the X-axis direction.

In the above-described structure, when an angular acceleration acts about the Z-axis, compressive stress acts in a region near a lateral surface of the support beam 63 in the negative side of the X-axis direction, and tensile stress acts in a region near a lateral surface of the support beam 63 in the positive side of the X-axis direction. Hence the support beam 63 flexes in the negative direction of the X-axis.

On that occasion, a gravity center (denoted by X in FIG. 13) of the rotating weight 62 is positioned on a neutral plane (denoted by a one-dot-chain line in FIG. 13) of the support beam when viewed in the X-Y plane. As a result, balance in rotation of the rotating weight 62 about the Z-axis can be ensured.

From the finite element analysis, it is confirmed that the stress is relatively small in a central wide region of the support beam 63 and is relatively large in narrow regions near both the ends thereof. It is hence thought that the angular acceleration about the Z-axis can be detected with higher detection sensitivity by setting a stress detection position of the detection portion 65 (not illustrated) to be located in the narrow regions near both the ends of the support beam 63.

Ninth Preferred Embodiment

Figure 14:
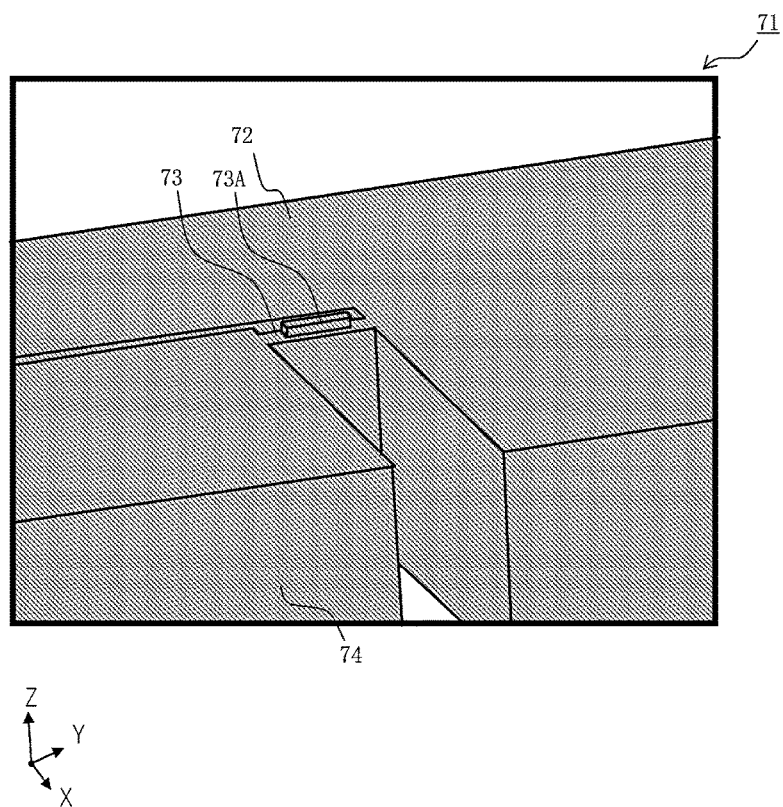
FIG. 14 is an explanatory view of an angular acceleration detection device according to a ninth preferred embodiment of the present invention.

FIG. 14 is a partial enlarged perspective view of an angular acceleration detection device 71 according to a ninth preferred embodiment of the present invention.

The angular acceleration detection device 71 includes a rotating weight 72, a support beam 73, a fixed portion 74, and a detection portion 75 (not illustrated). The rotating weight 72, the fixed portion 74, and the detection portion 75 (not illustrated) preferably have substantially the same structures as those in the fourth preferred embodiment. The ninth preferred embodiment is different from the fourth preferred embodiment mainly in that the support beam 73 includes a projected portion 73A on an upper surface thereof in the positive side of the Z-axis direction. The projected portion may be disposed only on the upper surface, only a lower surface, or on both the upper and lower surface of the support beam 73. With the provision of the projected portion 73A, the thickness of the support beam 73 in the Z-axis direction increases and rigidity of the support beam also increases. As a result, the support beam 73 can be prevented from being broken even when excessive bending stress acts about the X-axis.

Tenth Preferred Embodiment

Figure 15A:
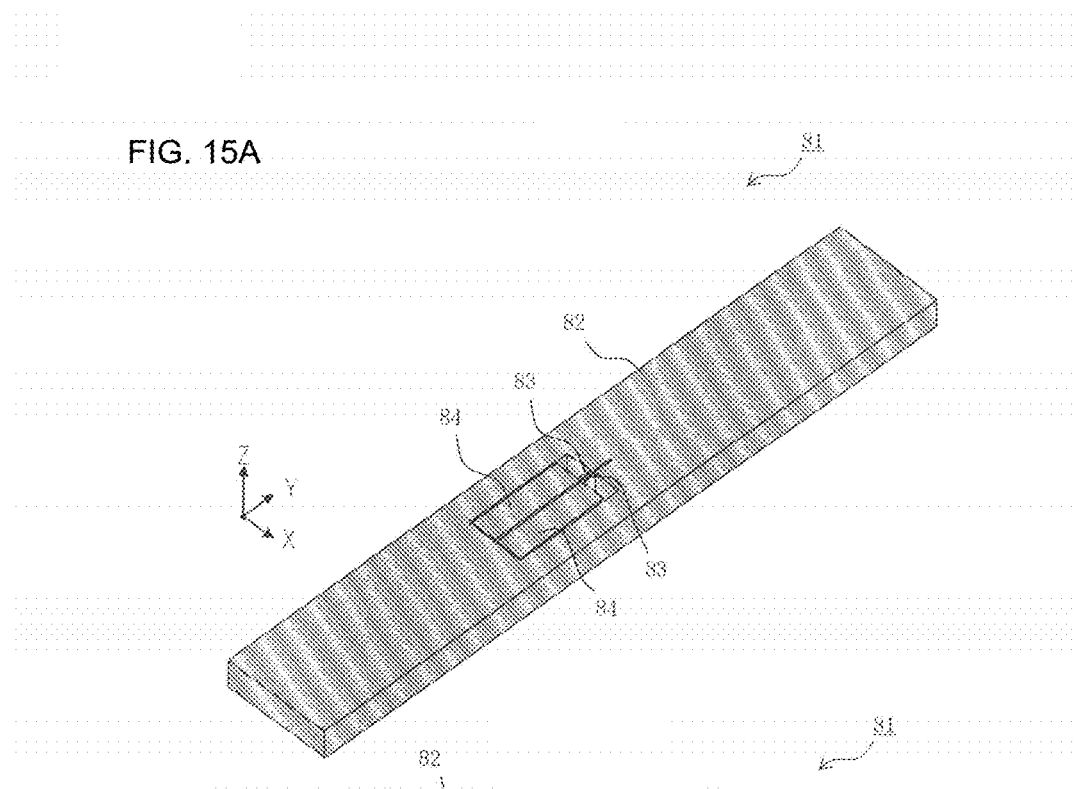
FIGS. 15A and 15B are explanatory views of an angular acceleration detection device according to a tenth preferred embodiment of the present invention.

FIG. 15A is a perspective view of an angular acceleration detection device 81 according to a tenth preferred embodiment of the present invention.

The angular acceleration detection device 81 is constituted preferably by arranging two angular acceleration detection devices, each having the same structure as that in the fourth preferred embodiment, in an abutted state in which two rotating weights are integrated with each other. The angular acceleration detection device 81 includes a rotating weight 82, support beams 83, fixed portions 84, and a detection portion 85 (not illustrated). The rotating weight 82 has a -like shape having an opening formed therein. A long axis of the rotating weight 82 is set to be the Y-axis direction, and a short axis thereof is set to be the X-axis direction. Two support beams 83 and two fixed portions 84 are arranged in the opening of the rotating weight 82. The two support beams 83 are disposed parallel or substantially parallel to each other on both the sides of a gravity center of the rotating weight 82 with a certain spacing between them. At least one of upper and lower surfaces of each of the two fixed portions 84 is fixed to a housing (not illustrated). Thus, the fixed portions 84 support the rotating weight 82 through the support beams 83 respectively.

Figure 15B:
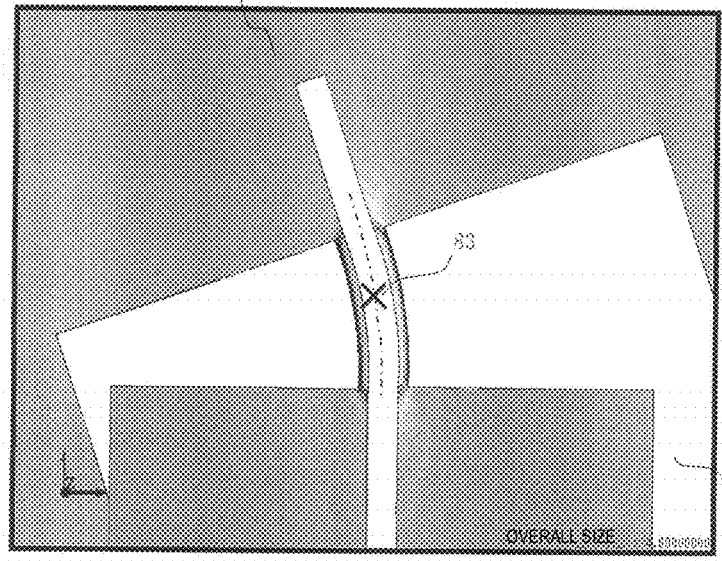

FIG. 15B is an explanatory view to explain a stress distribution generated in the support beam 83 when the rotational inertial force acts about the Z-axis. FIG. 15B illustrates a state where the angular acceleration detection device 81 is rotated clockwise when viewed from the positive direction of the Z-axis.

In such a case, the rotating weight 82 is caused to rotate counterclockwise with respect to the fixed portions 84 being a reference when viewed from the positive direction of the Z-axis, such that the rotational inertial force acts on the support beams 83 counterclockwise when viewed from the positive direction of the Z-axis. Therefore, compressive stress acts on the support beam 83 positioned in the negative side of the X-axis direction, and tensile stress acts on the support beam 83 positioned in the positive side of the X-axis direction. Hence the two support beams 83 flex in the negative direction of the X-axis.

On that occasion, a neutral plane (denoted by a one-dot-chain line in FIG. 15B) between the stresses acting on the two support beams 83 are aligned with an intermediate position between the two support beams 83. Moreover, a gravity center (denoted by X in FIG. 15B) of the rotating weight 82 is positioned on the above-mentioned neutral plane when viewed in the X-Y plane. As a result, the angular acceleration about the Z-axis can be detected with high detection sensitivity while balance in rotation of the rotating weight 82 about the Z-axis is ensured.

Eleventh Preferred Embodiment

Figure 16:
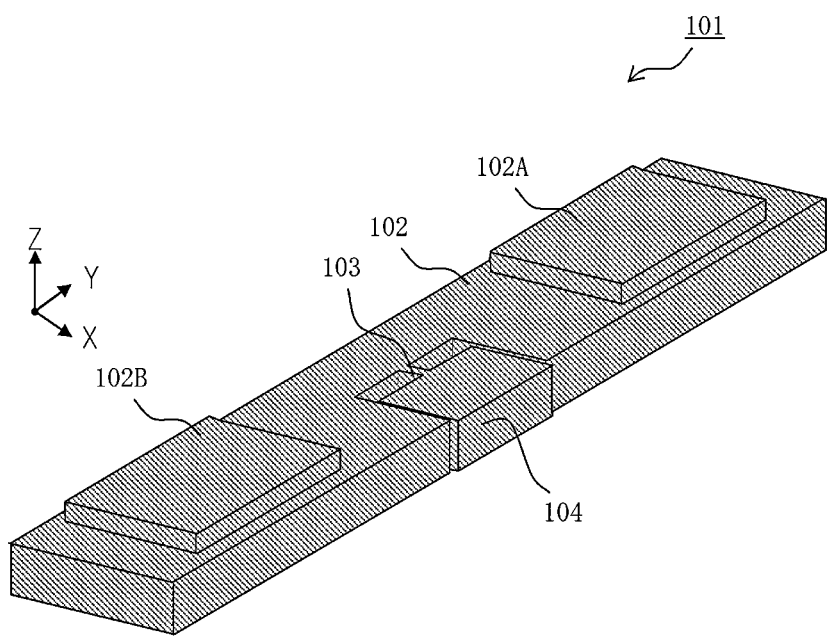
FIG. 16 is an explanatory view of an angular acceleration detection device according to an eleventh preferred embodiment of the present invention.

FIG. 16 is a perspective view illustrating a configuration of an angular acceleration detection device 101 according to an eleventh preferred embodiment of the present invention.

The angular acceleration detection device 101 includes a rotating weight 102, a support beam 103, a fixed portion 104, and a detection portion 105 (not illustrated). The support beam 103, the fixed portion 104, and the detection portion 105 (not illustrated) preferably have substantially the same structures as those in the third preferred embodiment. The eleventh preferred embodiment is different from the third preferred embodiment mainly in that the rotating weight 102 includes partially projected portions 102A and 102B on an upper surface thereof in the positive side of the Z-axis direction. The partially projected portions may be disposed only on the upper surface, only a lower surface, or on both the upper and lower surface of the rotating weight 102.

Also in the angular acceleration detection device 101 constituted as described above, when the rotational inertial force acts about the Z-axis, the rotating weight 102 is caused to rotate (oscillate) about the Z-axis with respect to the fixed portion 104 in the X-Y plane, such that the angular acceleration can be detected with the Z-axis serving as the detection axis.

Twelfth Preferred Embodiment

Figure 17:
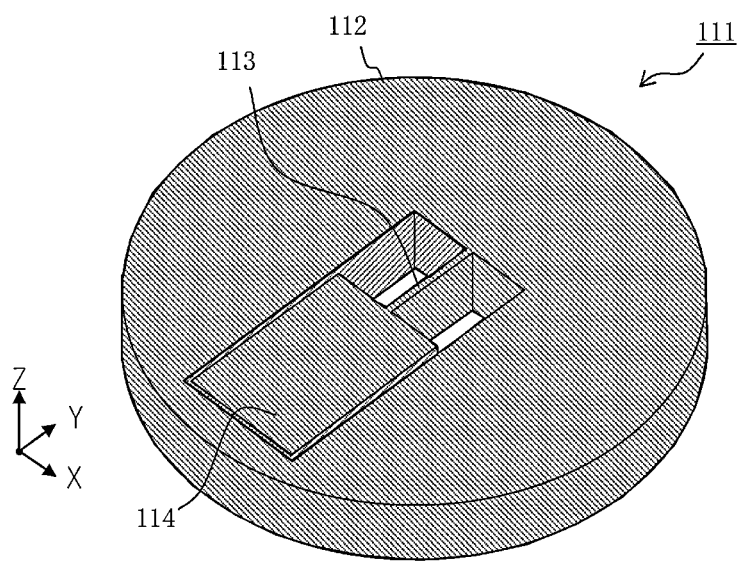
FIG. 17 is an explanatory view of an angular acceleration detection device according to a twelfth preferred embodiment of the present invention.

FIG. 17 is a perspective view illustrating a configuration of an angular acceleration detection device 111 according to a twelfth preferred embodiment of the present invention.

The angular acceleration detection device 111 includes a rotating weight 112, a support beam 113, a fixed portion 114, and a detection portion 115 (not illustrated). The rotating weight 112 preferably has a circular or substantially circular external shape. Also in the angular acceleration detection device 111 constituted as described above, when the rotational inertial force acts about the Z-axis, the rotating weight 112 is caused to rotate (oscillate) about the Z-axis with respect to the fixed portion 114 in the X-Y plane, such that the angular acceleration can be detected with the Z-axis serving as the detection axis.

Thirteenth Preferred Embodiment

Figure 18:
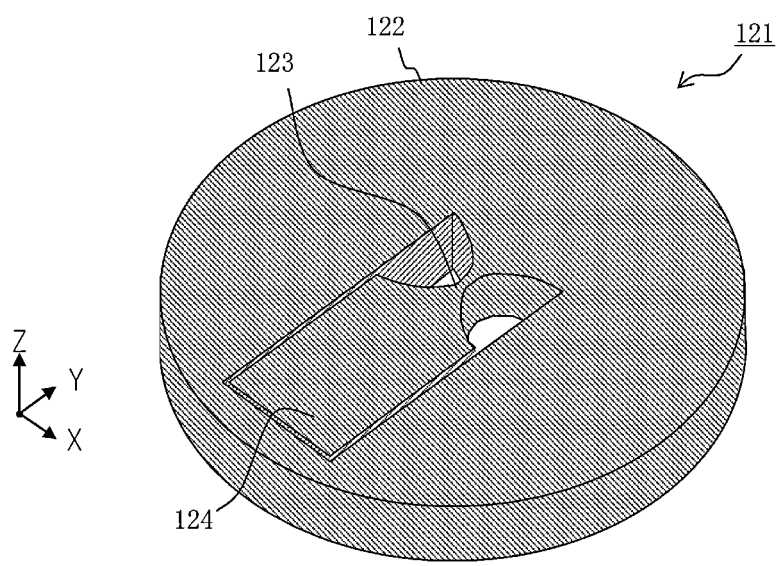
FIG. 18 is an explanatory view of an angular acceleration detection device according to a thirteenth preferred embodiment of the present invention.

FIG. 18 is a perspective view illustrating a configuration of an angular acceleration detection device 121 according to a thirteenth preferred embodiment of the present invention.

The angular acceleration detection device 121 includes a rotating weight 122, a support beam 123, a fixed portion 124, and a detection portion 125 (not illustrated). The rotating weight 122 preferably has a circular or substantially circular external shape. When viewed in the X-Y plane, the support beam 123 includes a narrow central portion and gradually widens toward both ends thereof with each of its lateral surfaces extending in a semicircular or substantially semicircular shape. Also in the angular acceleration detection device 121 constituted as described above, when the rotational inertial force acts about the Z-axis, the rotating weight 122 is caused to rotate (oscillate) about the Z-axis with respect to the fixed portion 124 in the X-Y plane, such that the angular acceleration can be detected with the Z-axis serving as the detection axis.

Fourteenth Preferred Embodiment

Figure 19:
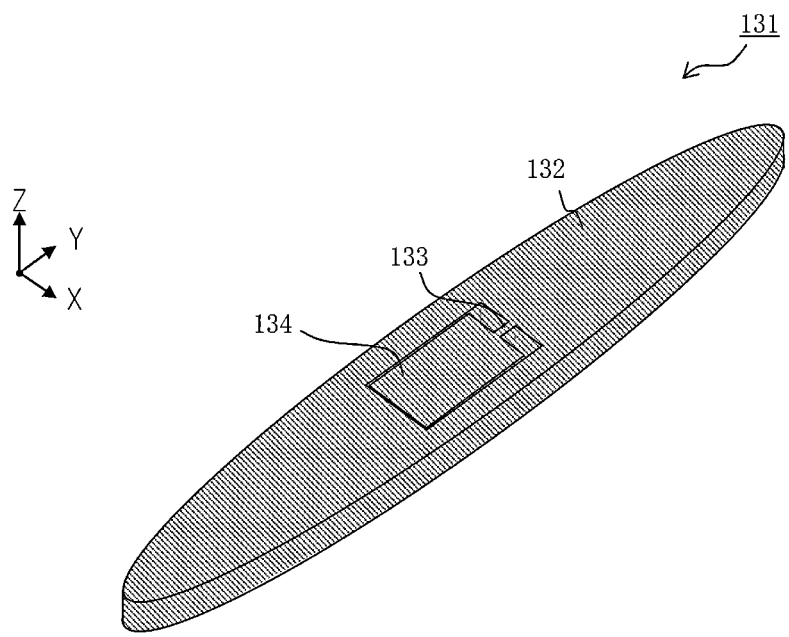
FIG. 19 is an explanatory view of an angular acceleration detection device according to a fourteenth preferred embodiment of the present invention.

FIG. 19 is a perspective view illustrating a configuration of an angular acceleration detection device 131 according to a fourteenth preferred embodiment of the present invention.

The angular acceleration detection device 131 includes a rotating weight 132, a support beam 133, a fixed portion 134, and a detection portion 135 (not illustrated). The rotating weight 132 preferably has an elliptical or substantially elliptical external shape with a major axis thereof set to be the Y-axis direction and a minor axis thereof set to be the X-axis direction. Also in the angular acceleration detection device 131 constituted as described above, when the rotational inertial force acts about the Z-axis, the rotating weight 132 is caused to rotate (oscillate) about the Z-axis with respect to the fixed portion 134 in the X-Y plane, such that the angular acceleration can be detected with the Z-axis serving as the detection axis.

Fifteenth Preferred Embodiment

Figure 20:
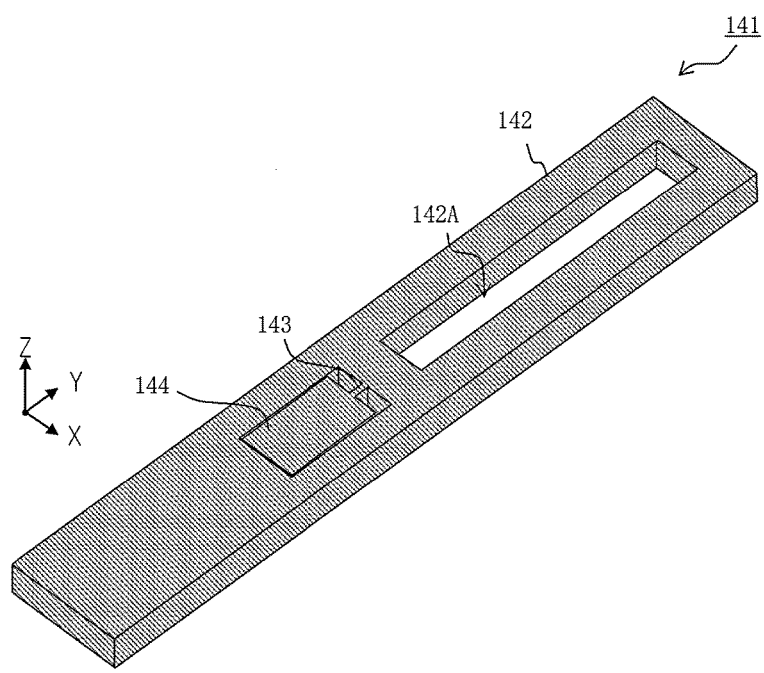
FIG. 20 is an explanatory view of an angular acceleration detection device according to a fifteenth preferred embodiment of the present invention.

FIG. 20 is a perspective view illustrating a configuration of an angular acceleration detection device 141 according to a fifteenth preferred embodiment of the present invention.

The angular acceleration detection device 141 includes a rotating weight 142, a support beam 143, a fixed portion 144, and a detection portion 145 (not illustrated). The rotating weight 142 preferably has a rectangular or substantially rectangular external shape and includes a rectangular or substantially rectangular opening 142A formed therein. With the provision of the opening 142A, it is easier to adjust a gravity center position of the rotating weight 142. Also in the angular acceleration detection device 141 constituted as described above, when the rotational inertial force acts about the Z-axis, the rotating weight 142 is caused to rotate (oscillate) about the Z-axis with respect to the fixed portion 144 in the X-Y plane, such that the angular acceleration can be detected with the Z-axis serving as the detection axis.

Sixteenth Preferred Embodiment

Figure 21:
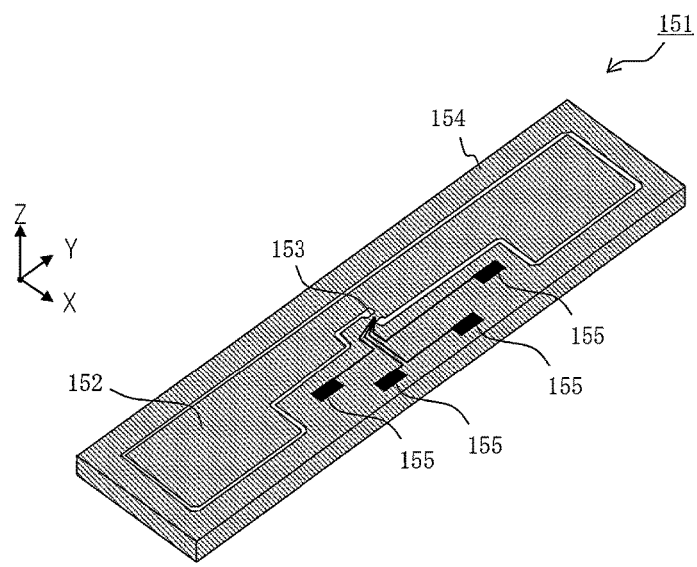
FIG. 21 is an explanatory view of an angular acceleration detection device according to a sixteenth preferred embodiment of the present invention.

FIG. 21 is a perspective view illustrating a configuration of an angular acceleration detection device 151 according to a sixteenth preferred embodiment of the present invention.

The angular acceleration detection device 151 includes a rotating weight 152, a support beam 153, a fixed portion 154, lead-out electrodes 155, and a detection portion 156 (not illustrated). In the angular acceleration detection device 151, the fixed portion 154 is arranged in the outer peripheral side, and the rotating weight 152 is arranged inside the fixed portion 154.

The fixed portion 154 preferably has a rectangular or substantially rectangular ring-like external shape, when viewed in the X-Y plane, with a long axis thereof set to be the Y-axis direction and a short axis thereof set to be the X-axis direction. The rotating weight 152 is arranged in an opening of the fixed portion 154 and preferably has a substantially elongated C-shaped configuration that is opened in the positive direction of the X-axis, when viewed in the X-Y plane. The support beam 153 is arranged at a gravity center position of the rotating weight 152. A direction of length of the support beam 153 is set to be the Y-axis direction, and a direction of width thereof is set to be the X-axis direction. The lead-out electrodes 155 are led out from the support beam 153 to an upper surface of the fixed portion 154. Also in the angular acceleration detection device 151 constituted as described above, when the rotational inertial force acts about the Z-axis, the rotating weight 152 is caused to rotate (oscillate) about the Z-axis with respect to the fixed portion 154 in the X-Y plane, such that the angular acceleration can be detected with the Z-axis serving as the detection axis.

In the above-described structure, when plural angular acceleration detection devices 151 are separated from a semiconductor wafer, outer peripheral surfaces of each of respective fixed portions 154 serve as separation surfaces. Therefore, when each angular acceleration detection device 151 is separated, the rotating weight 152 is prevented from contacting with another member, and the support beam 153 is prevented from breaking due to exertion of an excessive load upon the support beam 153. Furthermore, when the angular acceleration detection device is assembled into another member, the rotating weight 152 can also be prevented from contacting with another member, and the assembly operation can be facilitated.

Figure 22A:
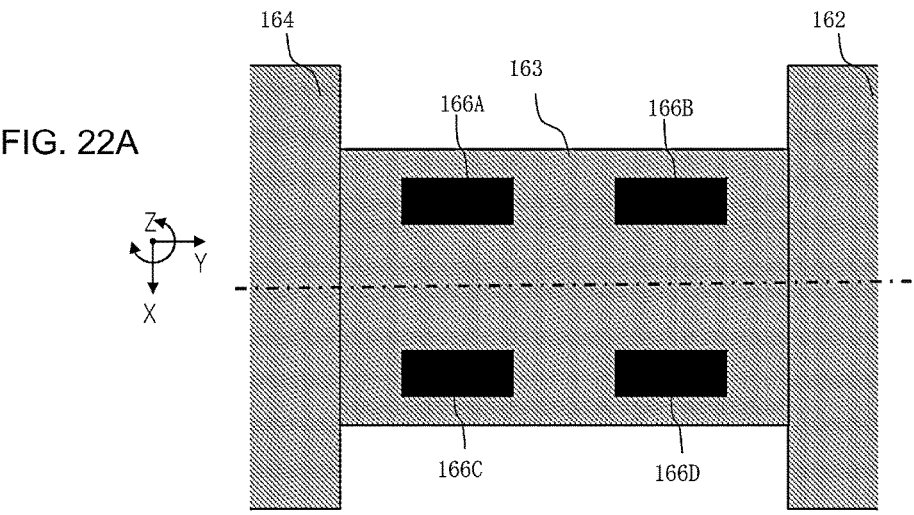
FIGS. 22A and 22B are explanatory view to explain a configuration of a detection circuit in the angular acceleration detection device.
Figure 22B:
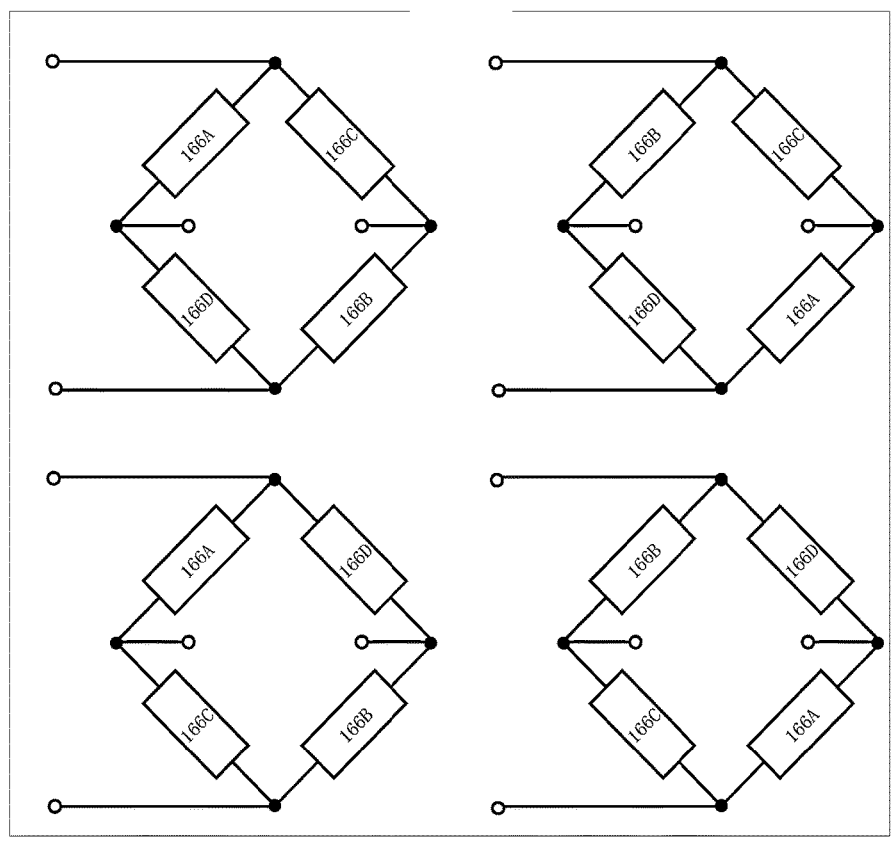

FIG. 22 is an explanatory view to explain another configuration of the detection portion.

The detection portion illustrated in FIG. 22 preferably includes four piezoresistances 166A to 166D. The piezoresistances 166A and 166B are arranged at an upper surface of a support beam 163 in the negative side of the X-axis direction relative to a neutral plane in the support beam 163. The piezoresistances 166C and 166D are arranged at the upper surface of the support beam 163 in the positive side of the X-axis direction relative to the neutral plane in the support beam 163. Furthermore, the piezoresistances 166A and 166C are arranged at the upper surface of the support beam 163 in the negative side of the Y-axis direction, and the piezoresistances 166B and 166D are arranged at the upper surface of the support beam 163 in the positive side of the Y-axis direction.

The piezoresistances 166A to 166D constitute a bridge circuit. The piezoresistances 166A and 166B are disposed in opposed twos of four sides of the bridge circuit, respectively, and the piezoresistances 166C and 166D are disposed in other opposed twos of the four sides of the bridge circuit, respectively.

One of the two piezoresistances disposed in one of opposite sides of the neutral plane in the support beam 163 is connected in series to one of the two piezoresistances disposed in the other side thereof, and two sets of serial circuits are connected in parallel to a constant voltage source or a constant current source. With such wiring, potentials at bridge output terminals change in reversed polarities depending on stress generated in the support beam 163, such that a potential difference between both the output terminals can be measured as a voltage variation. By including the bridge circuit, a larger potential difference is obtained with the same level of stress than the case where the angular acceleration is detected based on the voltage division ratio as described in the first preferred embodiment. Moreover, by including the bridge circuit, a common mode rejection ratio to drive power noise can be increased, and a minute electrical signal can be taken out at a good signal to noise ratio. As a result, the detection sensitivity and the detection accuracy of the angular acceleration are further increased.

Seventeenth Preferred Embodiment

Figure 23:
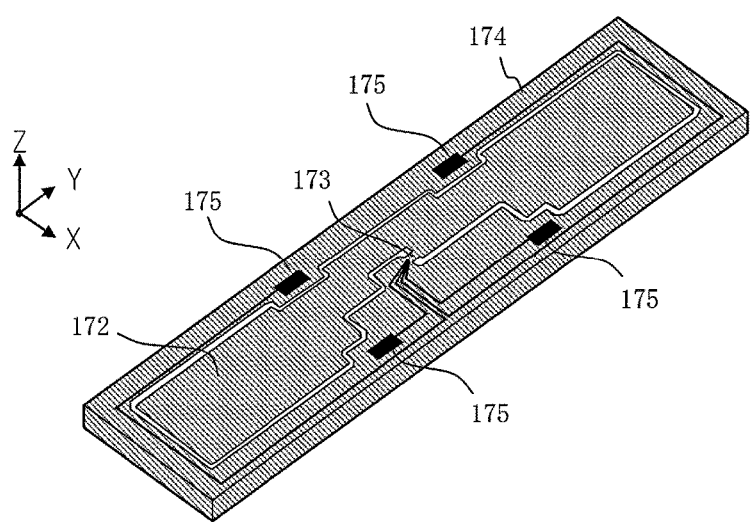
FIG. 23 is an explanatory view of an angular acceleration detection device according to a seventeenth preferred embodiment of the present invention.

FIG. 23 is a perspective view illustrating a configuration of an angular acceleration detection device 171 according to a seventeenth preferred embodiment of the present invention.

The angular acceleration detection device 171 includes a rotating weight 172, a support beam 173, a fixed portion 174, lead-out electrodes 175, and a detection portion 176 (not illustrated). In the angular acceleration detection device 171, as in the sixteenth preferred embodiment, the fixed portion 174 is arranged in the outer peripheral side, and the rotating weight 172 is arranged inside the fixed portion 174. The seventeenth preferred embodiment is different from the sixteenth preferred embodiment mainly in positions where the lead-out electrodes 175 are arranged.

When the angular acceleration detection device 171 is accommodated in a housing, electrical signals are required to be read from the lead-out electrodes 175 that are connected to the piezoresistances, respectively. From the restrictions imposed on working of the housing, however, a distance between adjacent two of the lead-out electrodes 175 has to be set not less than a certain length.

When the lead-out electrodes are all disposed in a region of the fixed portion, which is positioned on one side of the rotating weight, as described in the sixteenth preferred embodiment, an area necessary for forming the lead-out electrodes is increased and hence the size of the rotating weight 172 is required to be reduced, thus causing reduction of the moment of inertia of the rotating weight, in the case of trying to maintain a certain area for the formation of the lead-out electrodes.

In consideration of the above-described point, in this preferred embodiment, two of the four lead-out electrodes 175 are disposed such that they are led out from one side to the opposite side of the fixed portion 174 with respect to the rotating weight 172. With such an arrangement, it is possible to prevent an increase of the area necessary for the formation of the lead-out electrodes, to ensure a large moment of inertia of the rotating weight 172, and to prevent degradation of the detection sensitivity of angular acceleration.

Figure 24A:
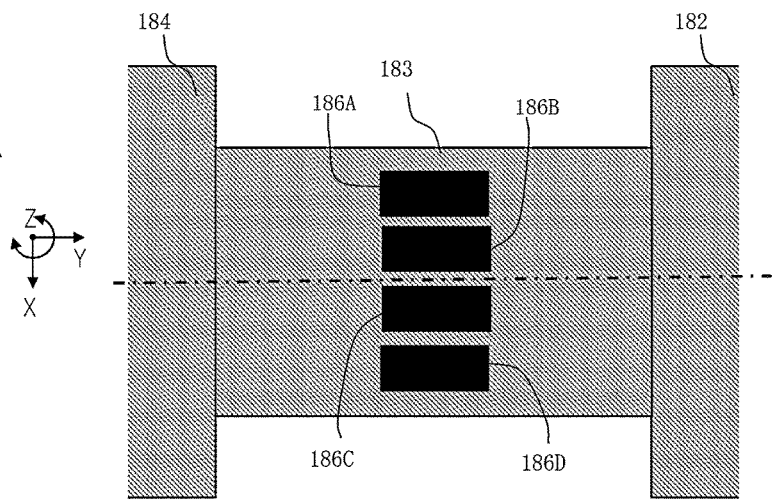
FIGS. 24A and 24B are explanatory views to explain a configuration of a detection circuit in the angular acceleration detection device.
Figure 24B:
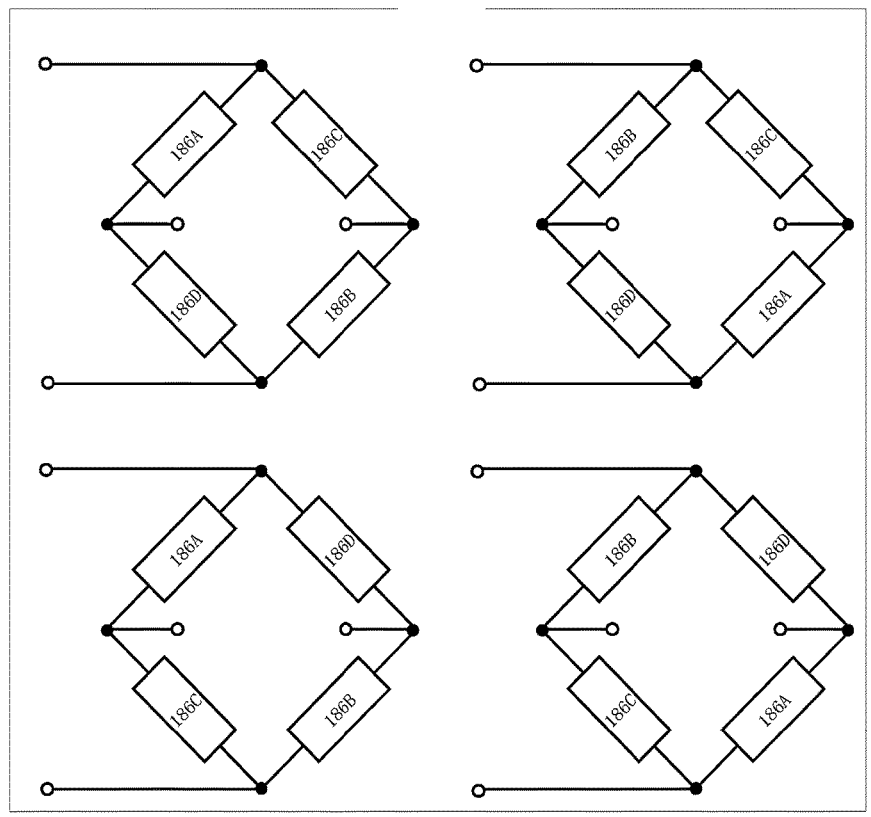

FIG. 24 is an explanatory view to explain still another configuration of the detection portion.

In the detection portion illustrated in FIG. 24, a bridge circuit preferably includes four piezoresistances 186A to 186D. The piezoresistances 186A and 186B are arranged parallel or substantially parallel to the Y-axis at an upper surface of a support beam 183 in the negative side of the X-axis direction relative to a neutral plane in the support beam 183. The piezoresistances 186C and 186D are arranged parallel or substantially parallel to the Y-axis at the upper surface of the support beam 183 in the positive side of the X-axis direction relative to the neutral plane in the support beam 183.

In that arrangement of the piezoresistances 186A to 186D, one of the two piezoresistances disposed in one of opposite sides of the neutral plane in the support beam 183 is connected in series to one of the two piezoresistances disposed in the other side thereof, and two sets of serial circuits are connected in parallel to a constant voltage source or a constant current source. With such wiring, potentials at bridge output terminals change in reversed polarities depending on stress generated in the support beam 183, such that a potential difference between both the output terminals can also be measured as a voltage variation.

Eighteenth Preferred Embodiment

Figure 25A:
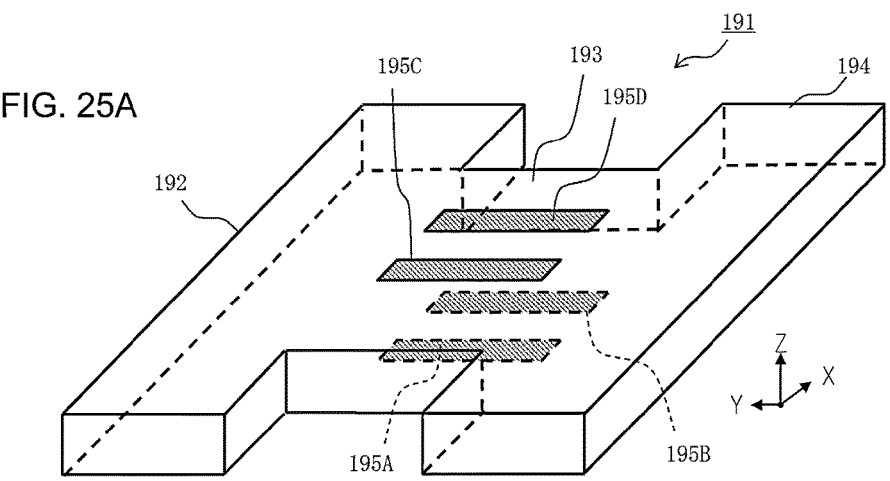
FIGS. 25A and 25B are explanatory views to explain a configuration of a detection circuit in an angular acceleration detection device according to an eighteenth preferred embodiment of the present invention.
Figure 25B:
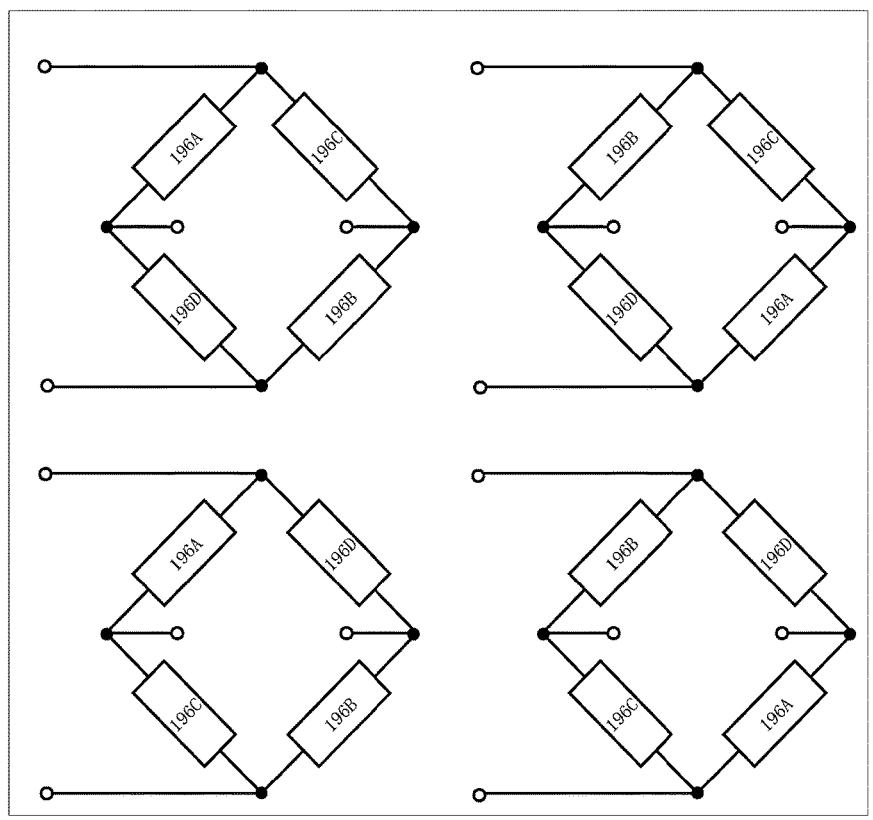

FIG. 25 is an explanatory view to explain a configuration of an angular acceleration detection device 191 according to an eighteenth preferred embodiment of the present invention. The angular acceleration detection device 191 of this preferred embodiment detects an angular acceleration about the X-axis as in the second preferred embodiment.

In the configuration illustrated in FIG. 25, a bridge circuit preferably includes four piezoresistances 196A to 196D. The piezoresistances 196A and 196B are arranged at a lower surface of a support beam 193. The piezoresistances 196C and 196D are arranged at an upper surface of the support beam 193.

In that arrangement of the piezoresistances 196A to 196D, one of the two piezoresistances disposed in one of opposite sides of a neutral plane (i.e., a plane parallel or substantially parallel to the X-Y plane) in the support beam 193 is connected in series to one of the two piezoresistances disposed in the other side thereof, and two sets of serial circuits are connected in parallel to a constant voltage source or a constant current source. With such wiring, potentials at bridge output terminals change in reversed polarities depending on stress generated in the support beam 193, such that a potential difference between both the output terminals can also be measured as a voltage variation.

The present invention can be variously practiced in accordance with the preferred embodiments described above, and the present invention can be suitably practiced by using at least such a constitution that the gravity center of the rotating weight is aligned with the support beam or with the neutral plane in the support beam.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An angular acceleration detection device comprising:
a rotating weight rotatable about a detection axis by action of an inertial force generated by an angular acceleration about the detection axis;
a fixed portion disposed at a position spaced from the rotating weight;
a support beam disposed in a plane perpendicular or substantially perpendicular to the detection axis between the fixed portion and the rotating weight, the support beam elastically supporting the rotating weight with respect to the fixed portion; and
a detection portion outputting a detection signal corresponding to stress generated in the support beam; wherein
a gravity center position of the rotating weight is aligned with the support beam when viewed in a direction of the detection axis;
the rotating weight completely surrounds a periphery of the fixed portion;
the support beam, the fixed portion, and the rotating weight are defined by a single member that has been processed and has a plate shape; and
a direction of length of the fixed portion is the same as a direction of length of the support beam.

2. The angular acceleration detection device according to claim 1, wherein the rotating weight has a shape with a direction of a long axis and a direction of a short axis in the plane.

3. The angular acceleration detection device according to claim 2, wherein the direction of length of the support beam corresponds to the direction of the long axis of the rotating weight.

4. The angular acceleration detection device according to claim 1, wherein the fixed portion includes an opening in which the support beam and the rotating weight are disposed.

5. The angular acceleration detection device according to claim 1, wherein the detection portion includes a bridge circuit in which elements outputting detection signals corresponding to the stresses acting on the support beam are disposed respectively in four sides of the bridge circuit, and the elements in adjacent sides of the bridge circuit are disposed in different sides with respect to a neutral plane in the support beam.

6. The angular acceleration detection device according to claim 1, wherein the detection portion includes resistance elements of which resistance values change corresponding to the stresses acting on the support beam.

7. The angular acceleration detection device according to claim 1, wherein the member having a plate shape is a semiconductor wafer.

8. The angular acceleration detection device according to claim 1, wherein the detection axis of the rotating weight extends in a direction of thickness of the member having a plate shape.

9. The angular acceleration detection device according to claim 8, wherein the support beam includes a projected portion projecting in the thickness direction of the member having a plate shape.

10. An angular acceleration detection device comprising:
a rotating weight rotatable about a detection axis by action of an inertial force generated by an angular acceleration about the detection axis;
a fixed portion disposed at a position spaced from the rotating weight;
a plurality of support beams disposed in a plane perpendicular or substantially perpendicular to the detection axis between the fixed portion and the rotating weight, the plurality of support beams elastically supporting the rotating weight with respect to the fixed portion; and
a detection portion outputting a detection signal corresponding to stresses generated in the plurality of support beams; wherein
a gravity center position of the rotating weight is aligned with a neutral plane of the stresses acting on the plurality of support beams with rotation of the rotating weight about the detection axis, when viewed in a direction of the detection axis;
the rotating weight completely surrounds a periphery of the fixed portion;
the plurality of support beams, the fixed portion, and the rotating weight are defined by a single member that has been processed and has a plate shape; and
a direction of length of the fixed portion is the same as a direction of length of the support beams.

11. The angular acceleration detection device according to claim 10, wherein the rotating weight has a shape with a direction of a long axis and a direction of a short axis in the plane.

12. The angular acceleration detection device according to claim 11, wherein the direction of length of the plurality of support beams corresponds to the direction of the long axis of the rotating weight.

13. The angular acceleration detection device according to claim 10, wherein the fixed portion includes an opening in which the plurality of support beams and the rotating weight are disposed.

14. The angular acceleration detection device according to claim 10, wherein the detection portion includes a bridge circuit in which elements outputting detection signals corresponding to the stresses acting on the plurality of support beams are disposed respectively in four sides of the bridge circuit, and the elements in adjacent sides of the bridge circuit are disposed in different sides with respect to a neutral plane in the plurality of support beams.

15. The angular acceleration detection device according to claim 10, wherein the detection portion includes resistance elements of which resistance values change corresponding to the stresses acting on the plurality of support beams.

16. The angular acceleration detection device according to claim 10, wherein the member having a plate shape is a semiconductor wafer.

17. The angular acceleration detection device according to claim 10, wherein the detection axis of the rotating weight extends in a direction of thickness of the member having a plate shape.

18. The angular acceleration detection device according to claim 17, wherein the plurality of support beams includes a projected portion projecting in the thickness direction of the member having a plate shape.

* * * * *